US012578896B2

(12) United States Patent
    Subramanian et al.

(10) Patent No.:    US 12,578,896 B2
(45) **Date of Patent:     \*Mar. 17, 2026**

(54) RESYNCHRONIZATION OF INDIVIDUAL VOLUMES OF A CONSISTENCY GROUP (CG) WITHIN A CROSS-SITE STORAGE SOLUTION WHILE MAINTAINING SYNCHRONIZATION OF OTHER VOLUMES OF THE CG

(71) Applicant: NetApp, Inc., San Jose, CA (US)

(72) Inventors: Murali Subramanian, Karnataka (IN); Akhil Kaushik, San Jose, CA (US); Anoop Vijayan, Karnataka (IN); Arun Kumar Selvam, Tamilnadu (IN)

(73) Assignee: NetApp, Inc., San Jose, CA (US)

( \* ) Notice:    Subject to any disclaimer, the term of this patent is extended or adjusted under 35 U.S.C. 154(b) by 0 days.

This patent is subject to a terminal disclaimer.

(21) Appl. No.: 18/673,753

(22) Filed:    May 24, 2024

(65)                Prior Publication Data
    US 2024/0393973 A1     Nov. 28, 2024

Related U.S. Application Data

(63) Continuation of application No. 18/053,561, filed on Nov. 8, 2022, now Pat. No. 12,045,491, which is a
                (Continued)

(51) Int. Cl.
    *G06F 3/06*                (2006.01)
(52) U.S. Cl.
    CPC ............ *G06F 3/065* (2013.01); *G06F 3/0619* (2013.01); *G06F 3/0644* (2013.01); *G06F 3/067* (2013.01)

(58) Field of Classification Search
    CPC ...... G06F 3/065; G06F 3/0619; G06F 3/0644; G06F 3/067
                (Continued)

(56)                References Cited

U.S. PATENT DOCUMENTS 4,853,875 A      8/1989   Brown
    5,742,792 A      4/1998   Yanai et al.
                (Continued)

OTHER PUBLICATIONS

Non-Final Office Action mailed Jan. 17, 2023 for U.S. Appl. No. 17/881,381, filed Aug. 4, 2022, 18 pages.
                (Continued)

*Primary Examiner* — Than Nguyen
(74) *Attorney, Agent, or Firm* — Jaffery Watson Hamilton & DeSanctis LLP

(57)                ABSTRACT

Systems and methods are provided for bringing a volume of a consistency group (CG) into an in-synchronization (In-Sync) state while other volumes of the CG remain in the InSync state. According to an example, in order to support recovery from disruptive events in a manner that ensures a zero recovery point objective (RPO) guarantee and insulates an application making use of the CG from adverse impacts, responsive to a triggering event, a Fast Resync process may first be attempted to promptly bring an affected volume back into an in-synchronization (InSync) state from an out of synchronization (OOS) state while allowing other members of the CG to remain in the InSync state. Should the Fast resync process be unsuccessful in bringing the volume back into the InSync state within a predetermined or configurable time threshold, then a second type of resynchronization process may be employed at the CG level.

20 Claims, 12 Drawing Sheets

Related U.S. Application Data continuation of application No. 17/495,990, filed on Oct. 7, 2021, now Pat. No. 11,537,314.

(58) Field of Classification Search
USPC ........................................................ 711/161
See application file for complete search history.

(56) References Cited

U.S. PATENT DOCUMENTS

| | | | |
|---|---|---|---|
| 6,389,551 | B1 | 5/2002 | Yount |
| 6,415,372 | B1 | 7/2002 | Zakai et al. |
| 6,732,124 | B1 | 5/2004 | Koseki et al. |
| 7,039,827 | B2 | 5/2006 | Meyer et al. |
| 7,475,204 | B2 | 1/2009 | Buah et al. |
| 7,500,014 | B1 | 3/2009 | Jacobson et al. |
| 7,631,066 | B1 | 12/2009 | Schatz et al. |
| 7,640,451 | B2 | 12/2009 | Meyer et al. |
| 7,644,305 | B2 | 1/2010 | Friedrich et al. |
| 7,890,626 | B1 | 2/2011 | Gadir |
| 8,498,967 | B1 | 7/2013 | Chatterjee et al. |
| 8,645,623 | B1 | 2/2014 | O'Shea et al. |
| 8,856,583 | B1 | 10/2014 | Visser et al. |
| 8,874,960 | B1 | 10/2014 | Khan et al. |
| 9,189,341 | B1 | 11/2015 | Natanzon et al. |
| 10,412,066 | B1 | 9/2019 | Vemuri |
| 10,489,230 | B1 | 11/2019 | Chen et al. |
| 10,496,320 | B2 | 12/2019 | Eisler et al. |
| 10,725,691 | B1 | 7/2020 | Kaushik et al. |
| 10,761,768 | B1 | 9/2020 | Kaushik et al. |
| 11,036,423 | B2 | 6/2021 | Kaushik et al. |
| 11,089,105 | B1 | 8/2021 | Karumbunathan et al. |
| 11,327,857 | B2 | 5/2022 | Bhargava et al. |
| 11,360,867 | B1 | 6/2022 | Subramanian et al. |
| 11,409,622 | B1 | 8/2022 | Kaushik et al. |
| 11,481,139 | B1 | 10/2022 | Vijayan et al. |
| 11,537,314 | B1 * | 12/2022 | Subramanian ........ G06F 3/0644 |
| 11,550,679 | B2 | 1/2023 | Kaushik et al. |
| 11,675,503 | B1 | 6/2023 | Ekins |
| 11,892,982 | B2 | 2/2024 | Subramanian et al. |
| 11,893,261 | B2 | 2/2024 | Narasingarayanapeta |
| 11,893,264 | B1 | 2/2024 | Vijayan |
| 11,934,670 | B2 | 3/2024 | Subramanian et al. |
| 12,045,491 | B2 * | 7/2024 | Subramanian .......... G06F 3/065 |
| 12,050,558 | B2 | 7/2024 | Subramanian et al. |
| 12,321,621 | B2 | 6/2025 | Subramanian et al. |
| 2002/0132613 | A1 | 9/2002 | Leung et al. |
| 2003/0037029 | A1 | 2/2003 | Holenstein et al. |
| 2004/0153719 | A1 | 8/2004 | Achiwa et al. |
| 2004/0267809 | A1 | 12/2004 | East et al. |
| 2005/0229034 | A1 | 10/2005 | Fujibayashi |
| 2005/0270855 | A1 | 12/2005 | Earhart et al. |
| 2006/0095478 | A1 | 5/2006 | Cherkauer et al. |
| 2006/0136354 | A1 | 6/2006 | Bell et al. |
| 2006/0150006 | A1 | 7/2006 | Mizutani |
| 2006/0236048 | A1 | 10/2006 | Deguchi et al. |
| 2007/0016754 | A1 | 1/2007 | Testardi |
| 2007/0180307 | A1 * | 8/2007 | Zohar ................... G06F 3/0607 714/E11.136 |
| 2007/0234006 | A1 | 10/2007 | Radulescu et al. |
| 2008/0201702 | A1 | 8/2008 | Bunn |
| 2009/0043979 | A1 | 2/2009 | Jarvis |
| 2009/0089609 | A1 | 4/2009 | Baba |
| 2009/0307530 | A1 | 12/2009 | Tarta |
| 2010/0064168 | A1 | 3/2010 | Smoot et al. |
| 2010/0082962 | A1 | 4/2010 | Srinivasan et al. |
| 2010/0161554 | A1 | 6/2010 | Datuashvili et al. |
| 2011/0106855 | A1 | 5/2011 | Resch et al. |
| 2011/0314148 | A1 | 12/2011 | Petersen et al. |
| 2012/0151249 | A1 | 6/2012 | Swan et al. |
| 2012/0259961 | A1 | 10/2012 | Winokur |
| 2013/0159620 | A1 | 6/2013 | Sakashita et al. |
| 2014/0298136 | A1 | 10/2014 | Resch et al. |
| 2015/0006949 | A1 | 1/2015 | Bittles et al. |
| 2015/0058838 | A1 | 2/2015 | Tsirkin |
| 2015/0378767 | A1 | 12/2015 | Tarasuk-Levin et al. |

| | | | |
|---|---|---|---|
| 2016/0063083 | A1 | 3/2016 | Mu et al. |
| 2016/0366226 | A1 | 12/2016 | Friedman et al. |
| 2017/0093983 | A1 | 3/2017 | Everhart et al. |
| 2018/0260125 | A1 | 9/2018 | Botes et al. |
| 2018/0352032 | A1 | 12/2018 | Liu et al. |
| 2019/0004908 | A1 | 1/2019 | Gopinath et al. |
| 2019/0034286 | A1 | 1/2019 | Brown et al. |
| 2019/0129976 | A1 | 5/2019 | Cha et al. |
| 2019/0163373 | A1 * | 5/2019 | Compton ................ G06F 3/065 |
| 2019/0212924 | A1 | 7/2019 | Ward et al. |
| 2019/0229978 | A1 | 7/2019 | Rajvaidya et al. |
| 2019/0347352 | A1 | 11/2019 | Gochkov et al. |
| 2019/0394266 | A1 | 12/2019 | Fukuyama et al. |
| 2020/0034258 | A1 | 1/2020 | Avraham et al. |
| 2020/0050495 | A1 | 2/2020 | Voutilainen et al. |
| 2020/0050587 | A1 | 2/2020 | Kaushik et al. |
| 2020/0081801 | A1 | 3/2020 | Brown et al. |
| 2020/0125460 | A1 | 4/2020 | Selvaraj et al. |
| 2020/0133520 | A1 | 4/2020 | Patnaik et al. |
| 2020/0242130 | A1 | 7/2020 | Chen et al. |
| 2020/0273984 | A1 | 8/2020 | Nakano et al. |
| 2020/0274812 | A1 | 8/2020 | Ouyang |
| 2020/0278984 | A1 | 9/2020 | Kaushik et al. |
| 2020/0319982 | A1 | 10/2020 | Rusev et al. |
| 2021/0303165 | A1 | 9/2021 | Kaushik et al. |
| 2021/0374157 | A1 | 12/2021 | Reddy et al. |
| 2022/0019350 | A1 | 1/2022 | Karr |
| 2022/0121533 | A1 | 4/2022 | Kumar et al. |
| 2022/0284328 | A1 | 9/2022 | Wang |
| 2022/0317896 | A1 | 10/2022 | Valan et al. |
| 2022/0318104 | A1 | 10/2022 | Bhargava et al. |
| 2022/0318105 | A1 | 10/2022 | Subramanian et al. |
| 2022/0357855 | A1 | 11/2022 | Narasingarayanapeta |
| 2022/0374321 | A1 | 11/2022 | Kaushik et al. |
| 2023/0119175 | A1 | 4/2023 | Kaushik et al. |
| 2023/0161495 | A1 | 5/2023 | Narasingarayanapeta |
| 2023/0168834 | A1 | 6/2023 | Narasingarayanapeta |
| 2023/0289076 | A1 | 9/2023 | Subramanian et al. |
| 2024/0012575 | A1 | 1/2024 | Narasingarayanapeta |
| 2024/0385995 | A1 | 11/2024 | Subramanian et al. |
| 2025/0165167 | A1 | 5/2025 | Vijan et al. |

OTHER PUBLICATIONS

Non-Final Office Action mailed on Apr. 13, 2023 for U.S. Appl. No. 18/066,775, filed Dec. 15, 2022, 16 pages.

Non-Final Office Action mailed on Feb. 17, 2023 for U.S. Appl. No. 17/510,795, filed Oct. 26, 2021, 11 pages.

Non-Final Office Action mailed on Mar. 16, 2023 for U.S. Appl. No. 17/970,961, filed Oct. 21, 2022, 6 pages.

Notice of Allowance mailed Dec. 13, 2022 for U.S. Appl. No. 17/219,815, filed Mar. 31, 2021.

Notice of Allowance mailed Nov. 2, 2022 for U.S. Appl. No. 17/495,990, filed Oct. 7, 2021, 8 pages.

Notice of Allowance mailed Nov. 18, 2022 for U.S. Appl. No. 17/219,812, filed Mar. 31, 2021, 12 pages.

Notice of Allowance mailed Oct. 31, 2022 for U.S. Appl. No. 17/219,812, filed Mar. 31, 2021, 9 pages.

Notice of Allowance mailed on Apr. 7, 2023 for U.S. Appl. No. 17/219,740, filed Mar. 31, 2021, 7 pages.

Notice of Allowance mailed on Feb. 2, 2024 for U.S. Appl. No. 17/219,759, filed Mar. 31, 2021, 05 pages.

Notice of Allowance mailed on Jan. 2, 2024 for U.S. Appl. No. 17/505,962, filed Oct. 20, 2021, 02 pages.

Notice of Allowance mailed on Jun. 14, 2023 for U.S. Appl. No. 17/505,962, filed Oct. 20, 2021, 8 pages.

Notice of Allowance mailed on Mar. 3, 2023 for U.S. Appl. No. 17/219,815, filed Mar. 31, 2021, 5 pages.

Notice of Allowance mailed on Mar. 13, 2024 for U.S. Appl. No. 18/053,561, filed Nov. 8, 2022, 08 pages.

Notice of Allowance mailed on Mar. 20, 2023 for U.S. Appl. No. 17/219,740, filed Mar. 31, 2021, 11 pages.

Notice of Allowance mailed on May 31, 2024 for U.S. Appl. No. 18/448,325, filed Aug. 11, 2023, 8 pages.

Notice of Allowance mailed on Sep. 20, 2023 for U.S. Appl. No. 17/219,759, filed Mar. 31, 2021, 07 pages.

(56) References Cited

OTHER PUBLICATIONS

Notice of Allowance mailed on Sep. 20, 2023 for U.S. Appl. No. 17/505,962, filed Oct. 20, 2021, 08 pages.

Pan L, "Paxos at Its Heart is Very Simple," Distributed System, 2018, Retrieved From : URL: https://blog.the-pans.com/paxos-explained/, pp. 1-12.

U.S. Non-Final Office action dated Dec. 21, 2021 in U.S. Appl. No. 17/238,829, filed Apr. 23, 2021, 20 pages.

U.S. Notice of Allowance dated Apr. 6, 2022 in U.S. Appl. No. 17/238,829, filed Apr. 23, 2021, 9 pages.

U.S. Notice of Allowance mailed Jun. 24, 2022 in U.S. Appl. No. 17/219,816, filed Mar. 31, 2021, 8 pages.

U.S. Notice of Allowance mailed May 6, 2022 in U.S. Appl. No. 17/219,746, filed Mar. 31, 2021, 18 pages.

U.S. Notice of Allowance mailed Oct. 26, 2022 in U.S. Appl. No. 17/219,812, filed Mar. 31, 2021, 9 pages.

Non-Final Office Action mailed on Aug. 30, 2024 for U.S. Appl. No. 18/320,788, filed May 19, 2023, 08 pages.

Notice of Allowance mailed on Jan. 13, 2025 for U.S. Appl. No. 18/320,788, filed May 19, 2023, 09 pages.

* cited by examiner

300

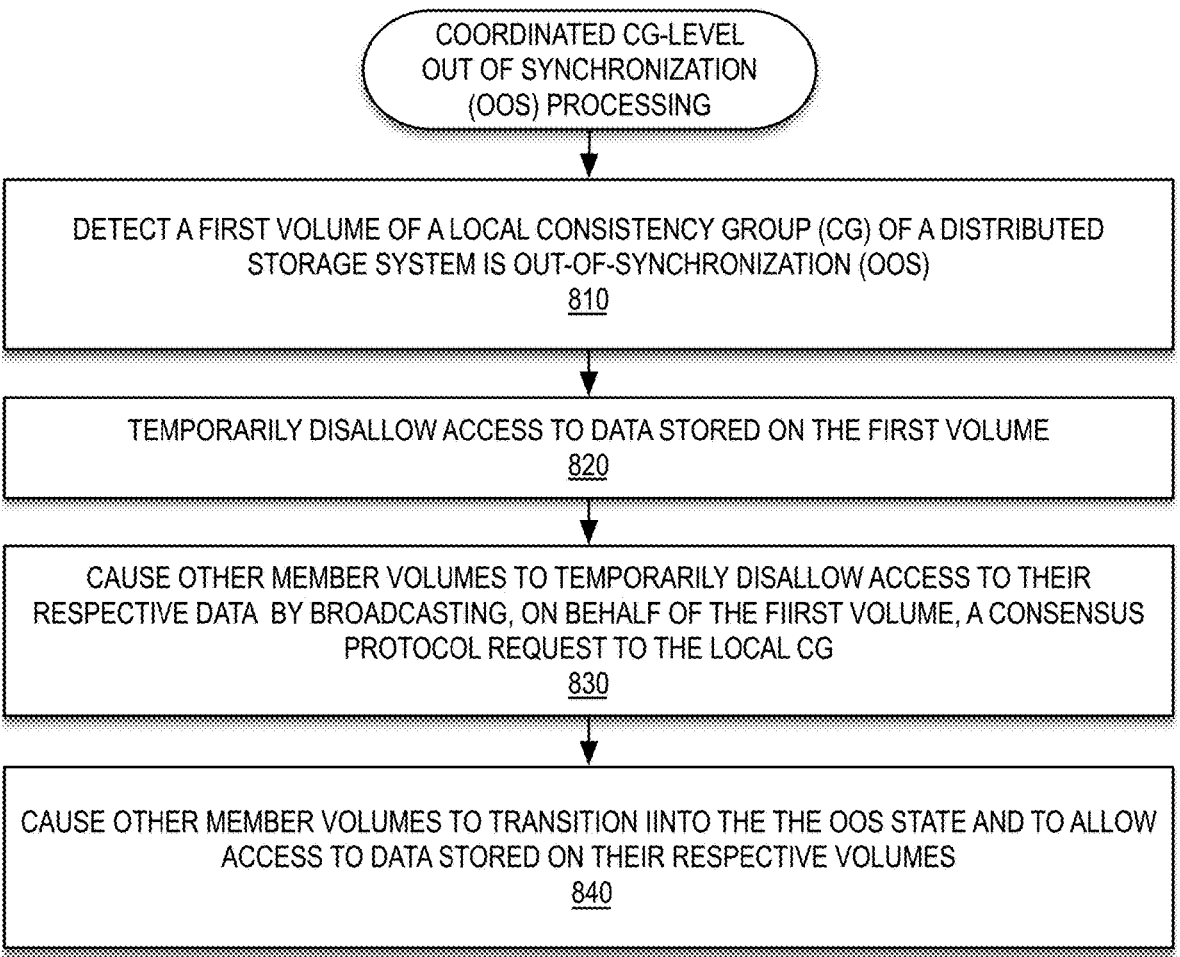

COORDINATED CG-LEVEL
OUT OF SYNCHRONIZATION
(OOS) PROCESSING

DETECT A FIRST VOLUME OF A LOCAL CONSISTENCY GROUP (CG) OF A DISTRIBUTED
STORAGE SYSTEM IS OUT-OF-SYNCHRONIZATION (OOS)
810

TEMPORARILY DISALLOW ACCESS TO DATA STORED ON THE FIRST VOLUME
820

CAUSE OTHER MEMBER VOLUMES TO TEMPORARILY DISALLOW ACCESS TO THEIR
RESPECTIVE DATA  BY BROADCASTING, ON BEHALF OF THE FIIRST VOLUME, A CONSENSUS
PROTOCOL REQUEST TO THE LOCAL CG
830

CAUSE OTHER MEMBER VOLUMES TO TRANSITION IINTO THE THE OOS STATE AND TO ALLOW
ACCESS TO DATA STORED ON THEIR RESPECTIVE VOLUMES
840

*FIG. 8A*

CONSISTENCY GROUP (CG)
RESYNCHRONIZATION

CAUSE A DEPENDENT WRITE-ORDER CONSISTENT SNAPSHOT TO BE CREATED FOR THE
REMOTE CG
850

BRING THE MIRROR COPY INTO AN INSYNC STATE BY ORCHESTRATING, INDEPENDENTLY
AND IN PARALLEL, TRANSFERS FOR EACH VOLUME OF THE LOCAL CG TO RESPECTIVE
PEERED VOLUMES OF THE REMOTE CG
860

RESYNCHRONIZATION OF INDIVIDUAL VOLUMES OF A CONSISTENCY GROUP (CG) WITHIN A CROSS-SITE STORAGE SOLUTION WHILE MAINTAINING SYNCHRONIZATION OF OTHER VOLUMES OF THE CG

CROSS-REFERENCE TO RELATED APPLICATIONS

This application is a continuation of U.S. patent application Ser. No. 18/053,561, filed Nov. 8, 2022, which is a continuation of U.S. patent application Ser. No. 17/495,990, filed Oct. 7, 2021, now U.S. Pat. No. 11,537,314. The contents of both of the foregoing patent applications are hereby incorporated by reference in their entirety for all purposes.

BACKGROUND

Field

Various embodiments of the present disclosure generally relate to multi-site distributed data storage systems. In particular, some embodiments relate to attempting performance of a fast resynchronization process of an individual member volume of a consistency group (CG) within cross-site storage solutions (e.g., cross-site high-availability (HA) storage solutions and cross-site asynchronous disaster recovery (DR) solutions) prior to falling back to a CG-level resynchronization process.

Description of the Related Art

Multiple storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives (HDDs), solid state drives (SSDs), flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume.

For various use cases, for example, involving data protection and data migration, it is desirable to efficiently and effectively manage a unit of storage objects/volumes as a single unit (e.g., as a consistency group); however, in other scenarios, it may be advantageous to independently attempt operations between a pair of peered volumes.

SUMMARY

Systems and methods are described for bringing a volume of a consistency group (CG) into an in-synchronization (InSync) state while other volumes of the CG remain in the InSync state. According to one embodiment, information is maintained regarding a state of data replication between a primary volume and a secondary volume of multiple volume pairs. The primary volume of a given volume pair of the multiple volume pairs is a member of a local CG of a primary cluster of a distributed storage system on which a primary dataset is stored and the secondary volume of the given volume pair is a member of a remote CG of a secondary cluster of the distributed storage system on which a mirror copy of the primary dataset is stored. A first volume pair of the multiple volume pairs for which the state of data replication is out-of-synchronization is brought into synchronization by selectively employing one or more of a first resynchronization process and a second resynchronization process.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 8A is a flow diagram illustrating a set of operations for performing a coordinated CG-level out of synchronization process in accordance with an embodiment of the present disclosure.

DETAILED DESCRIPTION

Figure 1:
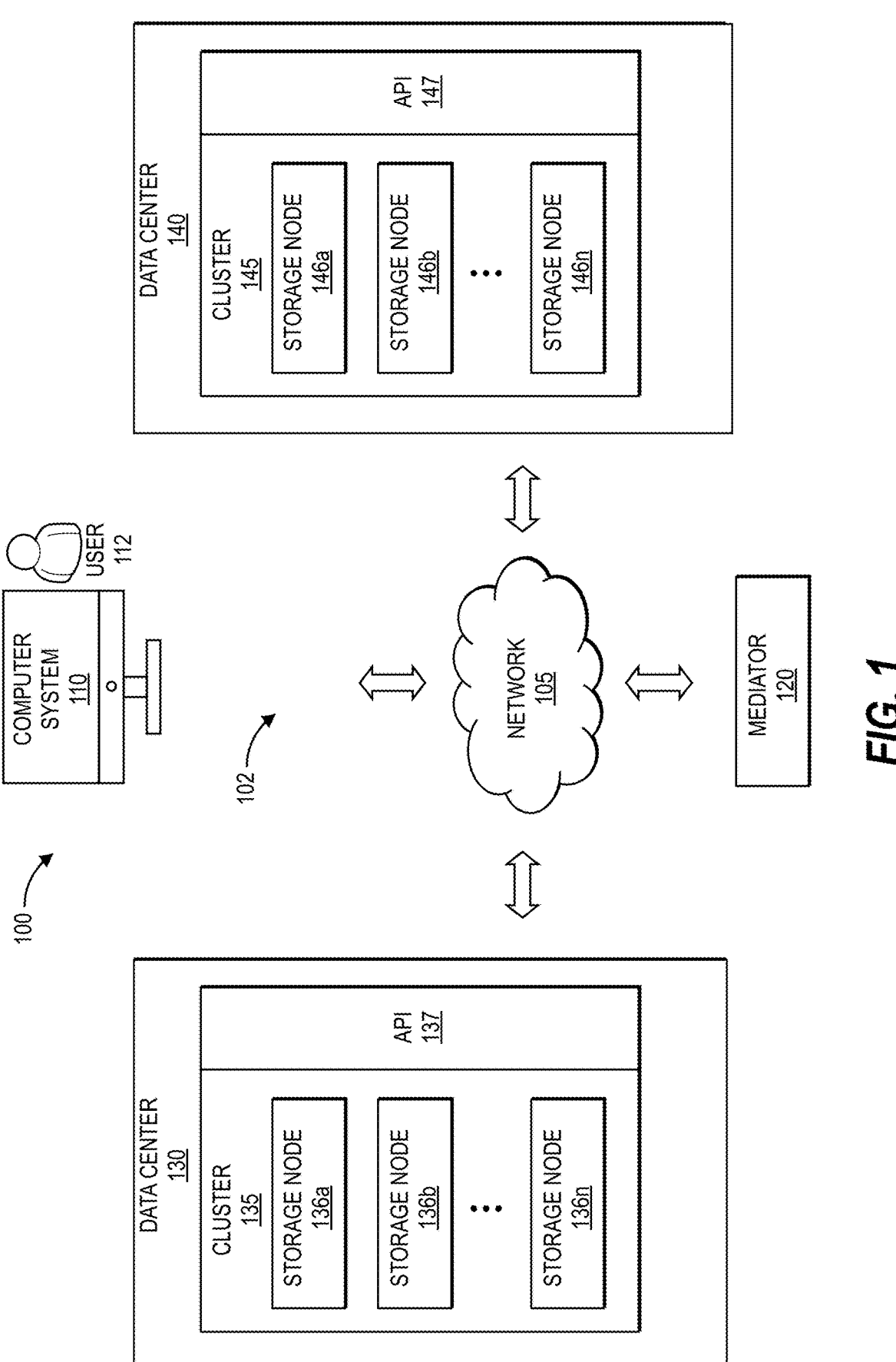
FIG. 1 is a block diagram illustrating an environment in which various embodiments may be implemented.

Systems and methods are described for efficiently performing various operations at the granularity of a consistency group within a cross-site storage solution. In the context of cross-site storage solutions (including cross-site HA storage solutions that perform synchronous data replication to support zero recovery time objective (RTO) protection and cross-site asynchronous DR solutions), a certain degree of consistency over time is maintained between a mirror copy and a primary dataset depending upon the particular implementation. Certain operations on a set of data containers/volumes (referred to herein as a consistency group (CG)) hosting the data at issue should be managed as a single unit, whereas others (e.g., fast resynchronization of a peered volume pair) may be performed at the volume level.

Various use cases, including asynchronous protection, synchronous protection, and planned migration may benefit from the use of CGs. For example, in support of asynchronous protection, a dataset associated with one or more volumes that are members of a local CG of a primary distributed storage system may be periodically transferred to a mirror copy associated with a remote CG of the secondary distributed storage system. This periodic transfer should provide a consistent image of the dataset across all members of a CG and should be transferred in an atomic fashion (all or nothing). In the meantime, the mirror copy may expose a view from the last known CG consistent point (e.g., from the last transfer, such as a baseline snapshot).

With respect to synchronous protection, the mirror copy should always be consistent with the dataset. As a result, any failures associated with synchronous replication should be handled in such a manner that the mirror copy remains consistent. For example, in order to support recovery from, among other potential disruptive events, manual planned disruptive events (e.g., moving either the primary or secondary volume location within the cluster, an intermittent network failure while replicating data from primary to secondary, or failure of nodes within the primary or secondary cluster balancing of CG members across a cluster) a fast resynchronization (or "Fast Resync") process should be provided to promptly bring the volume affected by the disruptive event back into a steady state of in-synchronization (InSync) from an OOS state while allowing other members of the local CG to remain in the InSync state. Should the Fast Resync process be unsuccessful in bringing the volume back into the InSync state within a time threshold (e.g., selected based on a typical command timeout interval), then a second type of resynchronization process may be employed at the CG level.

Embodiments described herein seek to improve various technological processes associated with cross-site storage solutions and attempt to avoid input/output (I/O) disruption resulting from an event that temporarily disrupts synchronous replication from impacting an application assigned to the CG at issue. Various embodiments of the present technology provide for a wide range of technical effects, advantages, and/or improvements to stretched storage systems and participating distributed storage systems. For example, various embodiments may include one or more of the following technical effects, advantages, and/or improvements: (i) independently bringing individual volumes of a CG that transitions into an out-of-synchronization (OOS) state, for example, as a result of a disruptive event, back into a steady state (InSync) via a Fast Resync process while allowing other member volumes of the CG that are not affected by the disruptive event to remain in the InSync state; and (ii) falling back to a CG-level resynchronization process when the Fast Resync process is not successful in bringing a volume back into the InSync state within the time threshold. In this manner, an application may be insulated from the disruptive event and a zero recovery point objective (RPO) guarantee may be maintained when the Fast Resync process is successful.

While some embodiments of the present disclosure are described herein with reference to particular usage scenarios in the context of cross-site HA storage solutions, it is to be noted that various embodiments of the present disclosure are applicable to various use cases that arise in the context of cross-cite storage solutions more generally, including cross-site asynchronous DR solutions.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example Operating Environment

FIG. 1 is a block diagram illustrating an environment 100 in which various embodiments may be implemented. In various examples described herein, an administrator (e.g., user 112) of a multi-site distributed storage system 102 having clusters 135 and cluster 145 or a managed service provider responsible for multiple distributed storage systems of the same or multiple customers may monitor various operations and network conditions of the distributed storage system or multiple distributed storage systems via a browser-based interface presented on computer system 110.

In the context of the present example, the multi-site distributed storage system 102 includes a data center 130, a data center 140, and optionally a mediator 120. The data centers 130 and 140, the mediator 120, and the computer system 110 are coupled in communication via a network 105, which, depending upon the particular implementation, may be a Local Area Network (LAN), a Wide Area Network (WAN), or the Internet.

The data centers 130 and 140 may represent an enterprise data center (e.g., an on-premises customer data center) that is owned and operated by a company or the data center 130 may be managed by a third party (or a managed service provider) on behalf of the company, which may lease the equipment and infrastructure. Alternatively, the data centers 130 and 140 may represent a colocation data center in which a company rents space of a facility owned by others and located off the company premises. The data centers are shown with a cluster (e.g., cluster 135, cluster 145). Those of ordinary skill in the art will appreciate additional IT infrastructure may be included within the data centers 130 and 140. In one example, the data center 140 is a mirrored copy of the data center 130 to provide non-disruptive operations at all times even in the presence of failures including, but not limited to, network disconnection between the data centers 130 and 140 and the mediator 120, which can also be located at a data center.

Turning now to the cluster 135, it includes multiple storage nodes 136a-n and an Application Programming Interface (API) 137. In the context of the present example, the multiple storage nodes 136a-n are organized as a cluster and provide a distributed storage architecture to service storage requests issued by one or more clients (not shown) of the cluster. The data served by the storage nodes 136a-n may be distributed across multiple storage units embodied as persistent storage devices, including but not limited to HDDs, SSDs, flash memory systems, or other storage devices. In a similar manner, cluster 145 includes multiple storage nodes 146a-n and an Application Programming Interface (API) 147. In the context of the present example, the multiple storage nodes 146a-n are organized as a cluster and provide a distributed storage architecture to service storage requests issued by one or more clients of the cluster.

The API 137 may provide an interface through which the cluster 135 is configured and/or queried by external actors (e.g., the computer system 110, data center 140, the mediator 120, clients). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration, storage efficiency metrics, and other system data) relating to the cluster 135 or components thereof. As those skilled in the art will appreciate various other types of telemetry data may be made available via the API 137, including, but not limited to measures of latency, utilization, and/or performance at various levels (e.g., the cluster level, the storage node level, or the storage node component level).

In the context of the present example, the mediator 120, which may represent a private or public cloud accessible (e.g., via a web portal) to an administrator associated with a managed service provider and/or administrators of one or more customers of the managed service provider, includes a cloud-based, monitoring system.

While for sake of brevity, only two data centers are shown in the context of the present example, it is to be appreciated that additional clusters owned by or leased by the same or different companies (data storage subscribers/customers) may be monitored and one or more metrics may be estimated based on data stored within a given level of a data store in accordance with the methodologies described herein and such clusters may reside in multiple data centers of different types (e.g., enterprise data centers, managed services data centers, or colocation data centers).

Figure 2:
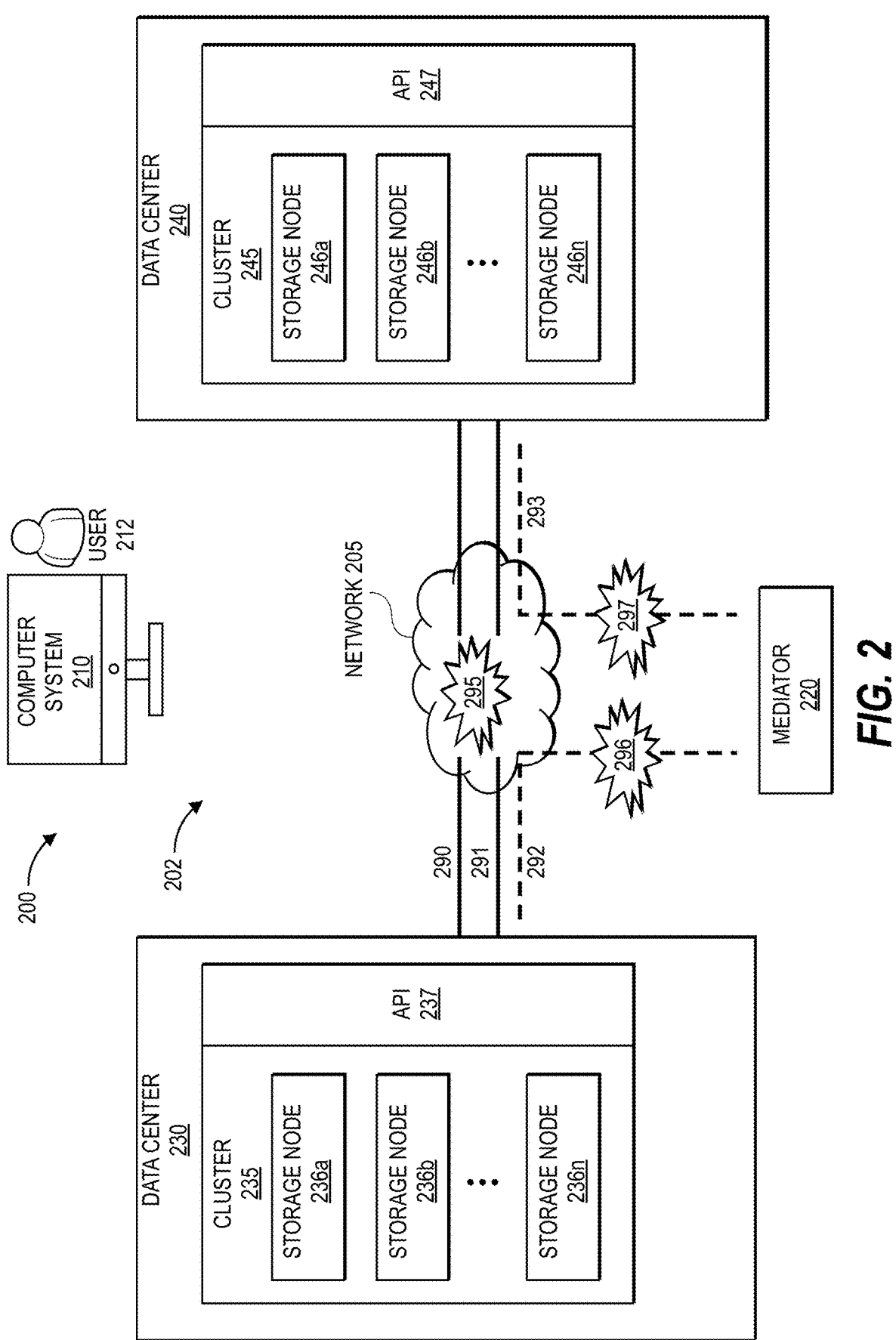
FIG. 2 is a block diagram illustrating an environment having potential failures within a multi-site distributed storage system in which various embodiments may be implemented.

FIG. 2 is a block diagram illustrating an environment 200 having potential failures within a multi-site distributed storage system 202 in which various embodiments may be implemented. In various examples described herein, an administrator (e.g., user 212) of a multi-site distributed storage system 202 having clusters 235 and cluster 245 or a managed service provider responsible for multiple distributed storage systems of the same or multiple customers may monitor various operations and network conditions of the distributed storage system or multiple distributed storage systems via a browser-based interface presented on computer system 210.

In the context of the present example, the system 202 includes data center 230, data center 240, and optionally a mediator 220. The data centers 230 and 240, the mediator 220, and the computer system 210 are coupled in communication via a network 205, which, depending upon the particular implementation, may be a Local Area Network (LAN), a Wide Area Network (WAN), or the Internet.

The data centers 230 and 240 may represent an enterprise data center (e.g., an on-premises customer data center) that is owned and operated by a company or the data center 230 may be managed by a third party (or a managed service provider) on behalf of the company, which may lease the equipment and infrastructure. Alternatively, the data centers 230 and 240 may represent a colocation data center in which a company rents space of a facility owned by others and located off the company premises. The data centers are shown with a cluster (e.g., cluster 235, cluster 245). Those of ordinary skill in the art will appreciate additional IT infrastructure may be included within the data centers 230 and 240. In one example, the data center 240 is a mirrored copy of the data center 230 to provide non-disruptive operations at all times even in the presence of failures including, but not limited to, network disconnection between the data centers 230 and 240 and the mediator 220, which can also be a data center.

The system 202 can utilize communications 290 and 291 to synchronize a mirrored copy of data of the data center 240 with a primary copy of the data of the data center 230. Either of the communications 290 and 291 between the data centers 230 and 240 may have a failure 295. In a similar manner, a communication 292 between data center 230 and mediator 220 may have a failure 296 while a communication 293 between the data center 240 and the mediator 220 may have a failure 297. If not responded to appropriately, these failures whether transient or permanent have the potential to disrupt operations for users of the distributed storage system 202. In one example, communications between the data centers 230 and 240 have approximately a 5-20 millisecond round trip time.

Turning now to the cluster 235, it includes at least two storage nodes 236a-b, optionally includes additional storage nodes (e.g., 236n) and an Application Programming Interface (API) 237. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

Turning now to the cluster 245, it includes at least two storage nodes 246a-b, optionally includes additional storage nodes (e.g., 246n) and includes an Application Programming Interface (API) 247. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

In one example, each cluster can have up to 5 CGs with each CG having up to 12 volumes. The system 202 provides a planned failover feature at a CG granularity. The planned failover feature allows switching storage access from a primary copy of the data center 230 to a mirror copy of the data center 240 or vice versa.

Figure 3:
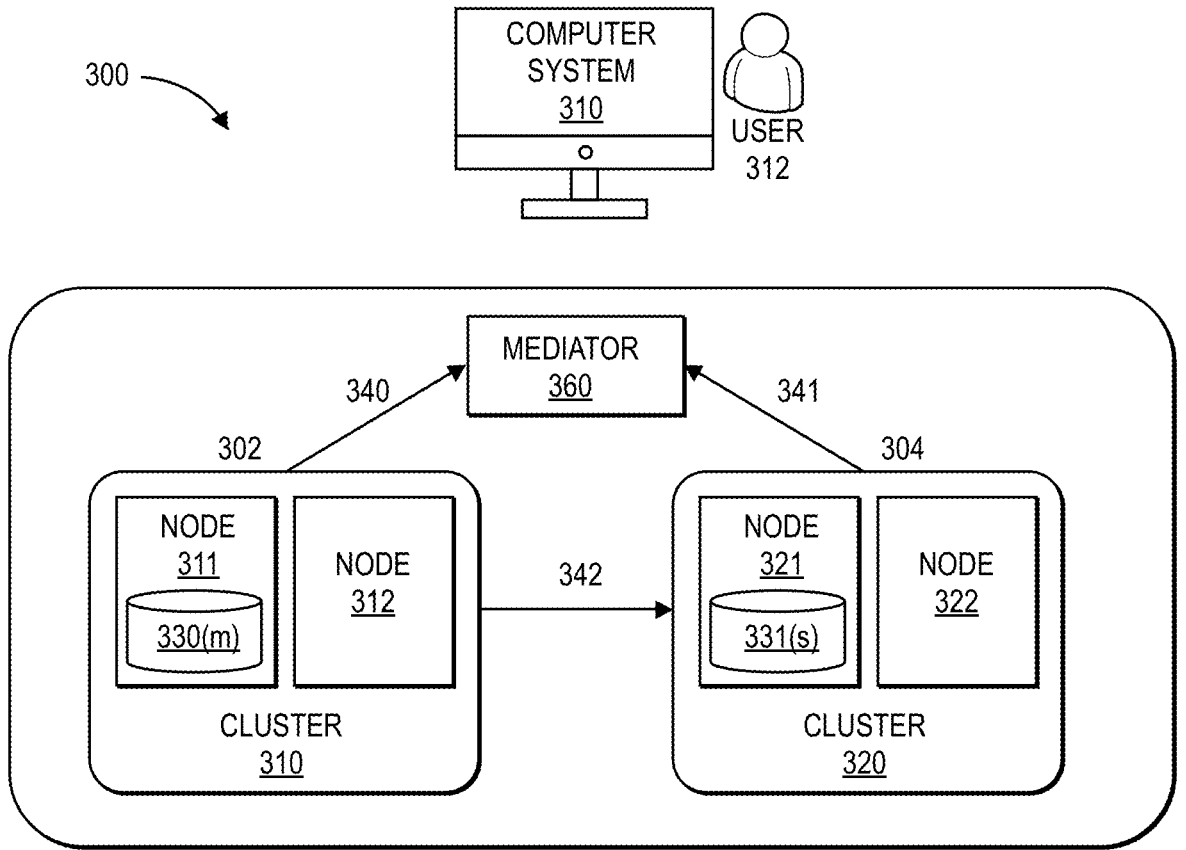
FIG. 3 is a block diagram of a multi-site distributed storage system according to various embodiments of the present disclosure.

FIG. 3 is a block diagram illustrating a multi-site distributed storage system 300 in which various embodiments may be implemented. In various examples described herein, an administrator (e.g., user 312) of the multi-site distributed storage system 302 or a managed service provider responsible for multiple distributed storage systems of the same or multiple customers may monitor various operations and network conditions of the distributed storage system or multiple distributed storage systems via a browser-based interface presented on computer system 310. In the context of the present example, the distributed storage system 300 includes a data center 302 having a cluster 310, a data center 304 having a cluster 320, and a mediator 360. The clusters 310, 320, and the mediator 360 are coupled in communication (e.g., communications 340-342) via a network, which, depending upon the particular implementation, may be a Local Area Network (LAN), a Wide Area Network (WAN), or the Internet.

The cluster 310 includes nodes 311 and 312 while the cluster 320 includes nodes 321 and 322. In one example, the cluster 320 has a data copy 331 that is a mirrored copy of the data copy 330 to provide non-disruptive operations at all times even in the presence of failures including, but not limited to, network disconnection between the data centers 302 and 304 and the mediator 360.

The multi-site distributed storage system 300 provides correctness of data, availability, and redundancy of data. In one example, the node 311 is designated as a primary (master) and the node 321 is designated as a secondary. The master is given preference to serve I/O commands to requesting clients and this allows the primary to obtain a consensus in a case of a race between the clusters 310 and 320. The mediator 360 enables an automated unplanned failover (AUFO) in the event of a failure. The data copy 330 (master), data copy 331 (secondary), and the mediator 360 form a three-way quorum. If two of the three entities reach an agreement for whether the primary or secondary should serve I/O commands to requesting clients, then this forms a strong consensus.

In one embodiment, node 311 may experience a failure and the data copy 331 for a storage object of node 312 remains InSync. The node 312 handles a takeover operation for data copy 330 (master). Upon a volume mount time, the node 311 temporarily disallows input/output operations (e.g., both read and write) with a retriable error. The I/O operations from a computer system 310 are not allowed at node 311 until resynchronization occurs or a timeout occurs. Next, the cluster 320 performs an automatic volume-level Fast Resynchronization (Fast Resync) to maintain zero recovery point objective (RPO) protection. The Fast Resync may be based on reestablishing a Sync Data Path between data copy 330 (master) of node 311 and data copy 330 (secondary) of mirrored node 321, and reconciling inflight regions based on persistent inflight tracking of I/O operations (IFT-P) as described further below. The secondary storage cluster 320 can be provided with necessary information about a high availability partner to avoid cross-cluster calls between the primary and secondary storage cluster. In one embodiment, no asynchronous transfers or transition are allowed during the Fast Resync, which may establish a transfer engine session and start persistent inflight op tracking replay. A Fast Resync can be triggered as soon a storage object on the secondary storage cluster is mounted. Subsequently, node 311 waits for resumption of synchronous replication and allows I/O upon completion of the synchronous replication. As described further below, if Fast Resync experiences an error or failure resulting in the Fast Resync not being possible within a certain time period (e.g., 30-90 seconds, 60 seconds), then a second type of resynchronization process may be employed at the CG level.

The primary and secondary roles for the clusters 310 and 320 help to avoid a split-brain situation with both of the clusters simultaneously attempting to serve I/O commands. There are scenarios where both primary and secondary copies can claim to be a primary copy. For example, a recovery post failover or failure during planned failover workflow can results in both clusters 310 and 320 attempting to serve I/O commands. In one example, a secondary cannot serve I/O until an AUFO happens. A primary doesn't serve I/O commands until the primary obtains a consensus.

The multi-site distributed storage system 300 presents a single virtual logical unit number (LUN) to a host computer or client using a synchronized-replicated distributed copies of a LUN. A LUN is a unique identifier for designating an individual or collection of physical or virtual storage devices that execute input/output (I/O) commands with a host computer, as defined by the Small System Computer Interface (SCSI) standard. In one example, active or passive access to this virtual LUN causes read and write commands to be serviced only by node 311 (master) while operations received by the node 321 (secondary) are proxied to node 311.

Example Storage Node

Figure 4:
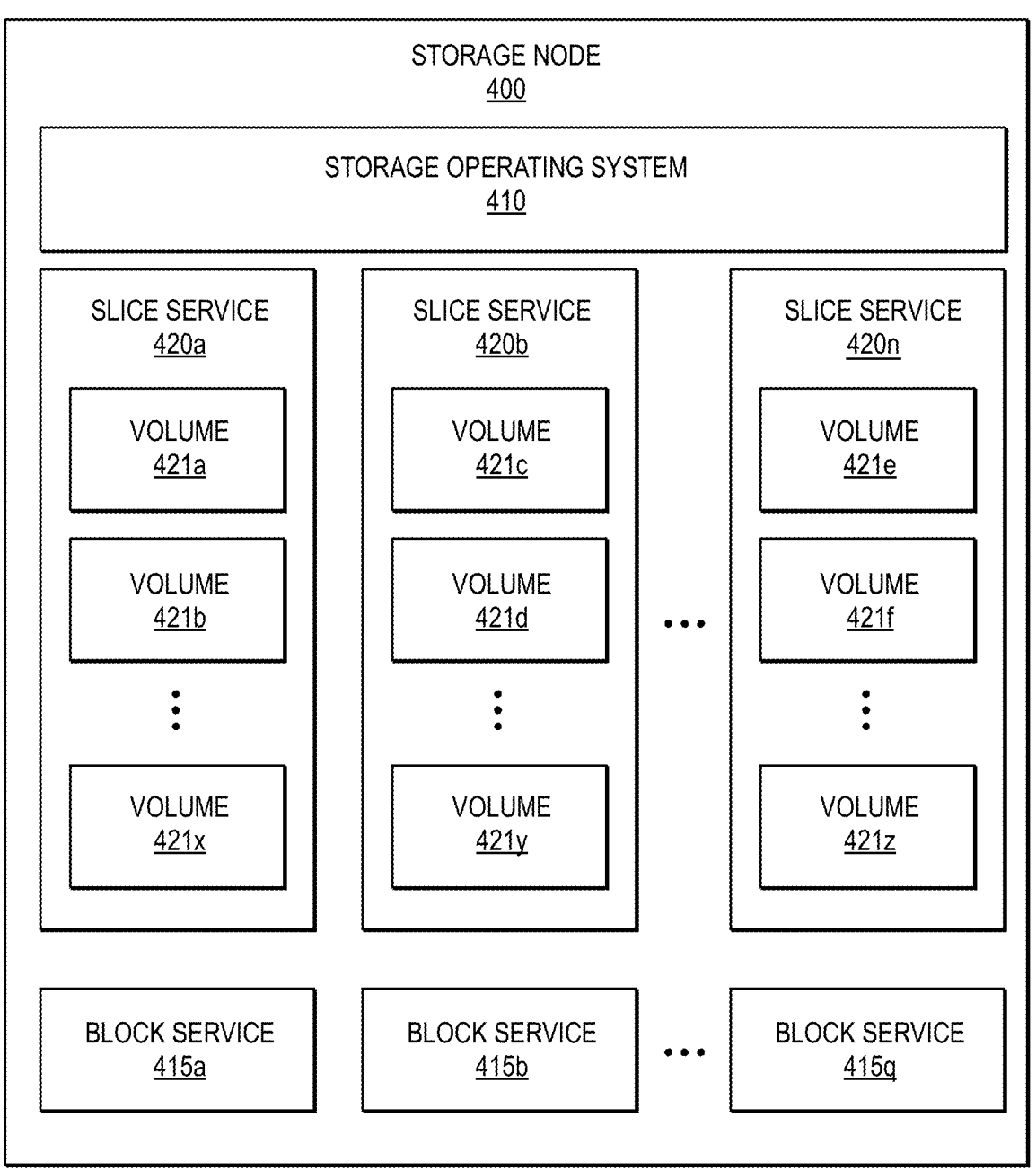
FIG. 4 is a block diagram illustrating a storage node in accordance with an embodiment of the present disclosure.

FIG. 4 is a block diagram illustrating a storage node 400 in accordance with an embodiment of the present disclosure. Storage node 400 represents a non-limiting example of storage nodes (e.g., 136a-n, 146a-n, 236a-n, 246a-n, 311, 312, 331, and 322) described herein. In the context of the present example, storage node 400 includes a storage operating system 410, one or more slice services 420a-n, and one or more block services 415a-q. The storage operating system (OS) 410 may provide access to data stored by the storage node 400 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 410 is NetApp Element Software (e.g., the SolidFire Element OS) based on Linux and designed for SSDs and scale-out architecture with the ability to expand up to 100 storage nodes.

Each slice service 420 may include one or more volumes (e.g., volumes 421*a*-*x*, volumes 421*c*-*y*, and volumes 421*e*-*z*). Client systems (not shown) associated with an enterprise may store data to one or more volumes, retrieve data from one or more volumes, and/or modify data stored on one or more volumes.

The slice services 420*a*-*n* and/or the client system may break data into data blocks. Block services 415*a*-*q* and slice services 420*a*-*n* may maintain mappings between an address of the client system and the eventual physical location of the data block in respective storage media of the storage node 400. In one embodiment, volumes 421 include unique and uniformly random identifiers to facilitate even distribution of a volume's data throughout a cluster (e.g., cluster 135). The slice services 420*a*-*n* may store metadata that maps between client systems and block services 415. For example, slice services 420 may map between the client addressing used by the client systems (e.g., file names, object names, block numbers, etc. such as Logical Block Addresses (LBAs)) and block layer addressing (e.g., block IDs) used in block services 415. Further, block services 415 may map between the block layer addressing (e.g., block identifiers) and the physical location of the data block on one or more storage devices. The blocks may be organized within bins maintained by the block services 415 for storage on physical storage devices (e.g., SSDs).

As noted above, a bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 415*a*-*q* and associated storage device (e.g., SSD). A sublist identifier may identify a sublist with the bin, which may be used to facilitate network transfer (or syncing) of data among block services in the event of a failure or crash of the storage node 400. Accordingly, a client can access data using a client address, which is eventually translated into the corresponding unique identifiers that reference the client's data at the storage node 400.

For each volume 421 hosted by a slice service 420, a list of block IDs may be stored with one block ID for each logical block on the volume. Each volume may be replicated between one or more slice services 420 and/or storage nodes 400, and the slice services for each volume may be synchronized between each of the slice services hosting that volume. Accordingly, failover protection may be provided in case a slice service 420 fails, such that access to each volume may continue during the failure condition.

Consistency Groups

Figure 5:
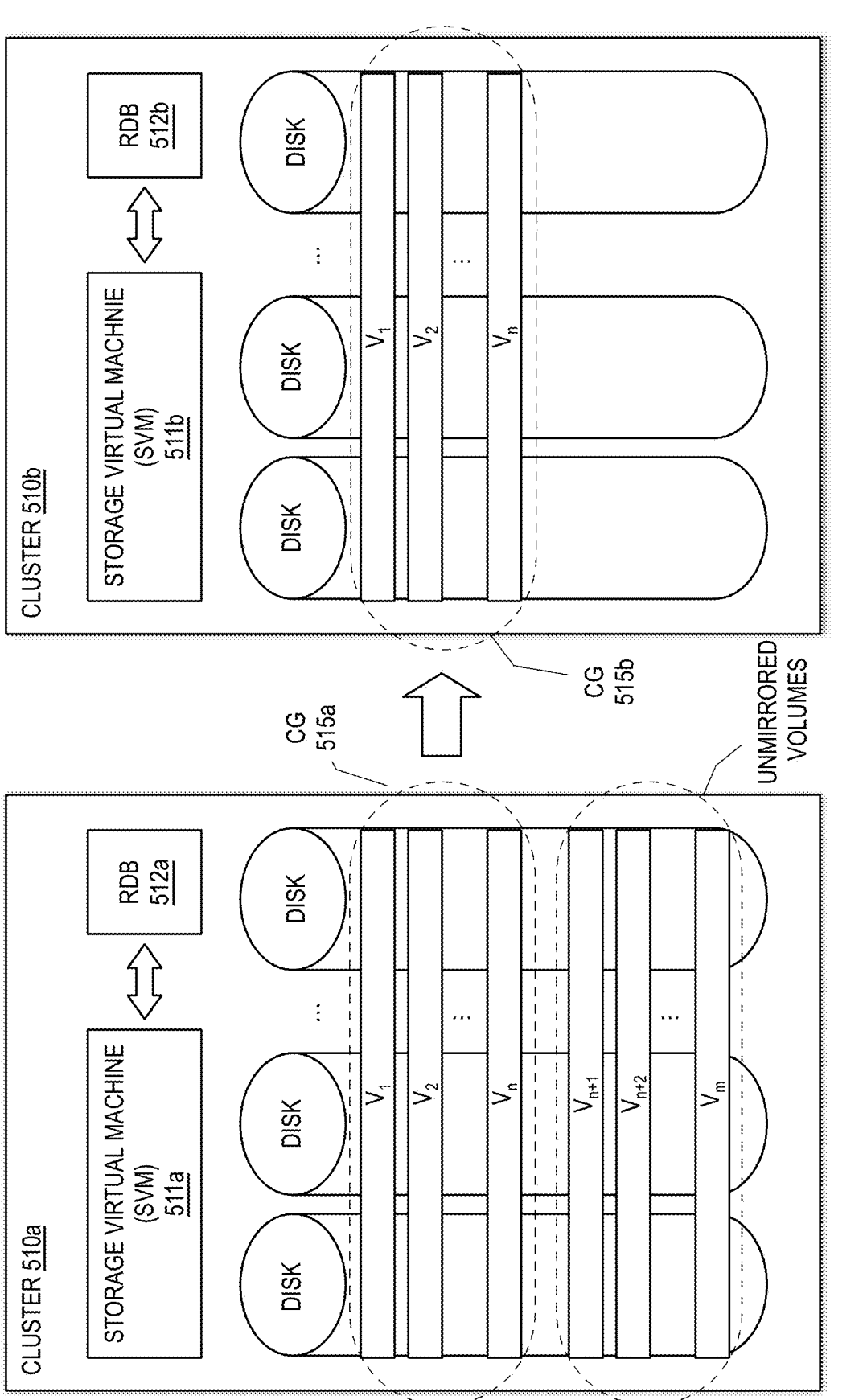
FIG. 5 is a block diagram illustrating the concept of a consistency group (CG) in accordance with an embodiment of the present disclosure.

FIG. 5 is a block diagram illustrating the concept of a consistency group (CG) in accordance with an embodiment of the present disclosure. In the context of the present example, a stretch cluster including two clusters (e.g., cluster 110*a* and 110*b*) is shown. The clusters may be part of a cross-site high-availability (HA) solution that supports zero recovery point objective (RPO) and zero recovery time objective (RTO) protections by, among other things, providing a mirror copy of a dataset at a remote location, which is typically in a different fault domain than the location at which the dataset is hosted. For example, cluster 110*a* may be operable within a first site (e.g., a local data center) and cluster 110*b* may be operable within a second site (e.g., a remote data center) so as to provide non-disruptive operations even if, for example, an entire data center becomes non-functional, by seamlessly failing over the storage access to the mirror copy hosted in the other data center.

According to some embodiments, various operations (e.g., data replication, data migration, data protection, failover, and the like) may be performed at the level of granularity of a CG (e.g., CG 115*a* or CG 115*b*). A CG is a collection of storage objects or data containers (e.g., volumes) within a cluster that are managed by a Storage Virtual Machine (e.g., SVM 111*a* or SVM 111*b*) as a single unit. In various embodiments, the use of a CG as a unit of data replication guarantees a dependent write-order consistent view of the dataset and the mirror copy to support zero RPO and zero RTO. CGs may also be configured for use in connection with taking simultaneous snapshot images of multiple volumes, for example, to provide crash-consistent copies of a dataset associated with the volumes at a particular point in time.

The volumes of a CG may span multiple disks (e.g., electromechanical disks and/or SSDs) of one or more storage nodes of the cluster. A CG may include a subset or all volumes of one or more storage nodes. In one example, a CG includes a subset of volumes of a first storage node and a subset of volumes of a second storage node. In another example, a CG includes a subset of volumes of a first storage node, a subset of volumes of a second storage node, and a subset of volumes of a third storage node. A CG may be referred to as a local CG or a remote CG depending upon the perspective of a particular cluster. For example, CG 115*a* may be referred to as a local CG from the perspective of cluster 110*a* and as a remote CG from the perspective of cluster 110*b*. Similarly, CG 115*a* may be referred to as a remote CG from the perspective of cluster 110*b* and as a local CG from the perspective of cluster 110*b*. At times, the volumes of a CG may be collectively referred to herein as members of the CG and may be individually referred to as a member of the CG. In one embodiment, members may be added or removed from a CG after it has been created.

A cluster may include one or more SVMs, each of which may contain data volumes and one or more logical interfaces (LIFs) (not shown) through which they serve data to clients. SVMs may be used to securely isolate the shared virtualized data storage of the storage nodes in the cluster, for example, to create isolated partitions within the cluster. In one embodiment, an LIF includes an Internet Protocol (IP) address and its associated characteristics. Each SVM may have a separate administrator authentication domain and can be managed independently via a management LIF to allow, among other things, definition and configuration of the associated CGs.

In the context of the present example, the SVMs make use of a configuration database (e.g., replicated database (RDB) 112*a* and 112*b*), which may store configuration information for their respective clusters. A configuration database provides cluster wide storage for storage nodes within a cluster. The configuration information may include relationship information specifying the status, direction of data replication, relationships, and/or roles of individual CGs, a set of CGs, members of the CGs, and/or the mediator. A pair of CGs may be said to be "peered" when one is protecting the other. For example, a CG (e.g., CG 115*b*) to which data is configured to be synchronously replicated may be referred to as being in the role of a destination CG, whereas the CG (e.g., CG 115*a*) being protected by the destination CG may be referred to as the source CG. Various events (e.g., transient or persistent network connectivity issues, availability/unavailability of the mediator, site failure, and the like) impacting the stretch cluster may result in the relationship information being updated at the cluster and/or the CG level to reflect changed status, relationships, and/or roles.

The level of granularity of operations supported by a CG is useful for various types of applications. As a non-limiting example, consider an application, such as a database application, that makes use of multiple volumes, including maintaining logs on one volume and the database on another volume. In such a case, the application may be assigned to a local CG of a first cluster that maintains the primary dataset, including an appropriate number of member volumes to meet the needs of the application, and a remote CG, for maintaining a mirror copy of the primary dataset, may be established on a second cluster to protect the local CG.

While in the context of various embodiments described herein, a volume of a CG may be described as performing certain actions (e.g., taking other members of a CG out of synchronization, disallowing/allowing access to the dataset or the mirror copy, issuing consensus protocol requests, etc.), it is to be understood such references are shorthand for an SVM or other controlling entity, managing or containing the volume at issue, performing such actions on behalf of the volume.

While in the context of various examples described herein, data replication may be described as being performed in a synchronous manner between a paired set of (or "peered") CGs associated with different clusters (e.g., from a primary cluster to a secondary cluster), data replication may also be performed asynchronously and/or within the same cluster. Similarly, a single remote CG may protect multiple local CGs and/or multiple remote CGs may protect a single local CG. For example, a local CG can be setup for double protection by two remote CGs via fan-out or cascade topologies. In addition, those skilled in the art will appreciate a cross-site high-availability (HA) solution may include more than two clusters, in which a mirrored copy of a dataset of a primary cluster is stored on more than one secondary cluster.

The various nodes (e.g., storage nodes 136*a-n* and storage node 200) of the distributed storage systems described herein, and the processing described below with reference to the flow diagrams of FIGS. 7-8 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems (e.g., servers, network storage systems or appliances, blades, etc.) of various forms, such as the computer system described with reference to FIG. 11 below.

Figure 6A:
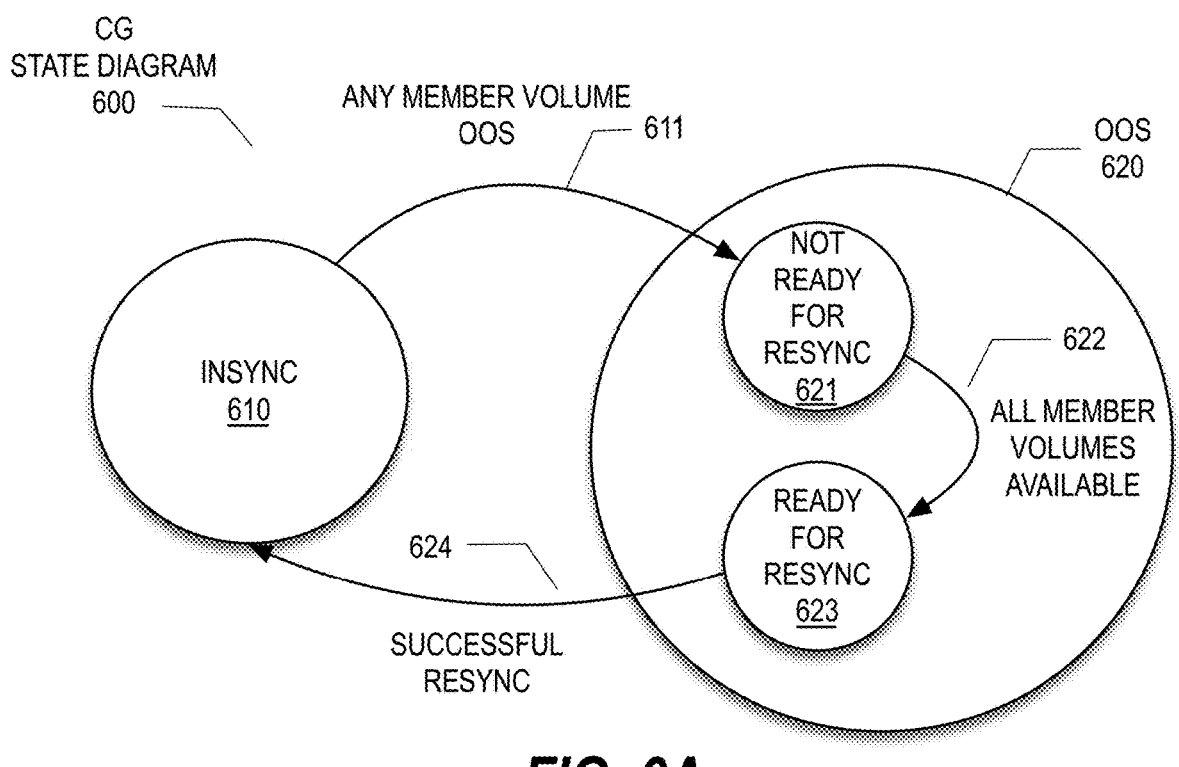
FIG. 6A is a CG state diagram in accordance with an embodiment of the present disclosure.

FIG. 6A is a CG state diagram 600 in accordance with an embodiment of the present disclosure. In the context of the present example, the data replication status of a CG can generally be in either of an InSync state (e.g., InSync 610) or an OOS state (e.g., OOS 620). Within the OOS state, two sub-states are shown, a not ready for resync state 621 and a ready for resync state 623.

While a given CG is in the InSync state, the mirror copy of the primary dataset associated with the member volumes of the given CG may be said to be in-synchronization with the primary dataset and asynchronous data replication or synchronous data replication, as the case may be, are operating as expected. When a given CG is in the OOS state, the mirror copy of the primary dataset associated with the member volumes of the given CG may be said to be out-of-synchronization with the primary dataset and asynchronous data replication or synchronous data replication, as the case may be, are unable to operate as expected. Information regarding the current state of the data replication status of a CG may be maintained in a configuration database (e.g., RDB 512*a* or 512*b*).

As noted above, in various embodiments described herein, the members (e.g., volumes) of a CG may be managed as a single unit for various situations. In the context of the present example, the data replication status of a given CG is dependent upon the data replication status of the individual member volumes of the CG. A given CG may transition 611 from the InSync state to the not ready for resync state 621 of the OOS state responsive to any member volume of the CG becoming OOS with respect to a peer volume with which the member volume is peered. A given CG may transition 622 from the not ready for resync state 621 to the ready for resync state 623 responsive to all member volumes being available. In order to support recovery from, among other potential disruptive events, manual planned disruptive events (e.g., balancing of CG members across a cluster) a resynchronization process is provided to bring the CG back into the InSync state from the OOS state. Responsive to a successful CG resync, a given CG may transition 624 from the ready for resync state 623 to the InSync state. A non-limiting example of a CG resynchronization process is described below with reference to FIG. 8B.

Although outside the scope of the present disclosure, for completeness it is noted that additional state transitions may exist. For example, in some embodiments, a given CG may transition from the ready for resync state 623 to the not ready for resync state 621 responsive to unavailability of a mediator (e.g., mediator 120) configured for the given CG. In such an embodiment, the transition 622 from the not ready for resync state 621 to the ready for resync state 623 should additionally be based on the communication status of the mediator being available.

Figure 6B:
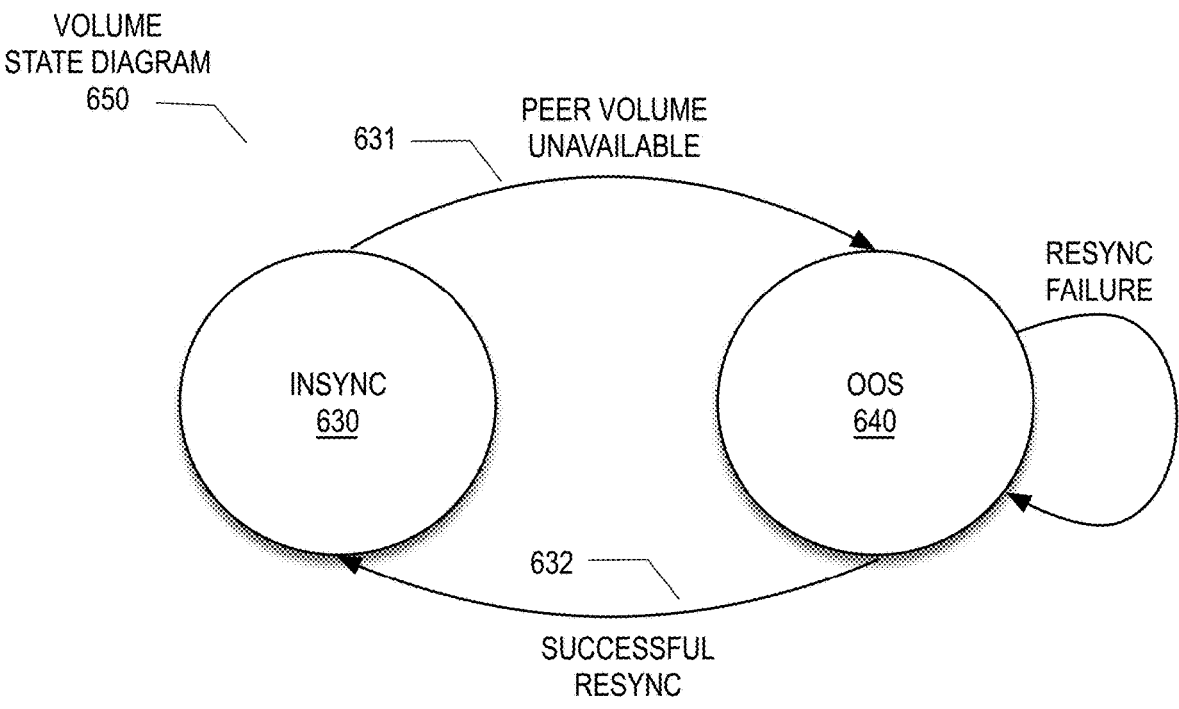
FIG. 6B is a volume state diagram in accordance with an embodiment of the present disclosure.

FIG. 6B is a volume state diagram 650 in accordance with an embodiment of the present disclosure. In the context of the present example, the data replication status of a volume can be in either of an InSync state (e.g., InSync 630) or an OOS state (e.g., OOS 640). While a given volume of a local CG (e.g., CG 515*a*) is in the InSync state, the given volume may be said to be in-synchronization with a peer volume of a remote CG (e.g., CG 515*b*) and the given volume and the peer volume are able to communicate with each other via the potentially unreliable network (e.g., network 205), for example, through their respective LIFs. When a given volume of the local CG is in the OOS state, the given volume may be said to be out-of-synchronization with the peer volume of the remote CG and the given volume and the peer volume are unable to communicate with each other. According to one embodiment, a periodic health check task may continuously monitor the ability to communicate between a pair of peered volumes. Information regarding the current state of the data replication status of a volume may be maintained in a configuration database (e.g., RDB 512*a* or 512*b*).

A given volume may transition 631 from the InSync state to the OOS state responsive to a peer volume being unavailable. A given volume may transition 632 from the OOS state to the InSync state responsive to a successful resynchronization with the peer volume. As described below in further detail, in one embodiment, two different types of resynchronization approaches may be implemented, including a Fast Resync process and a CG-level resync process, and selected for use individually or in sequence as appropriate for the circumstances. As described further below with reference to FIG. 7, the Fast Resync process makes an attempt to bring an individual volume of a CG that transitioned into the OOS state, for example, as a result of a disruptive operation back into the InSync state while allowing other volumes of the CG that were not affected by the disruptive operation to remain in the InSync state. The Fast Resync approach may preserve write-order consistency of the mirror copy by temporarily disallowing access to the primary copy of data stored on the volume at issue and resuming access upon successful completion of the Fast Resync process. When the Fast Resync process is able to bring the volume at issue back into the InSync state with a time threshold (e.g., selected based on a typical command timeout interval), an application assigned to the CG at issue may be insulated from the disruptive event and a zero recovery point objective (RPO) guarantee may be maintained.

In contrast, the CG-level resync process may preserve dependent write-order consistency of the mirror copy in a different manner. For example, responsive to any member volume of a given CG detecting it has gone OOS for any reason (e.g., a network failure), the CG-level resynch process may first involve a coordinated CG-level OOS process in which all member volumes are driven OOS as described with reference to FIG. 8A. This coordinated OOS approach is useful in a design in which I/O is desired to be allowed with one copy (local commit). As such, the other volumes in CG are disallowed from continuing to replicate writes so as to avoid dependent write-order inconsistency.

According to one embodiment, the Fast Resync process is attempted first for an individual volume that has become OOS and the slower CG-level resynchronization process (e.g., a coordinated CG-level OOS followed by a CG-level resync), may be avoided and may be used as a fallback for situations in which the Fast Resync process is unsuccessful in bringing the individual volume back into the InSync state within a time threshold (e.g., selected based on a typical command timeout interval).

High-Level Resynchronization Processing

Figure 7:
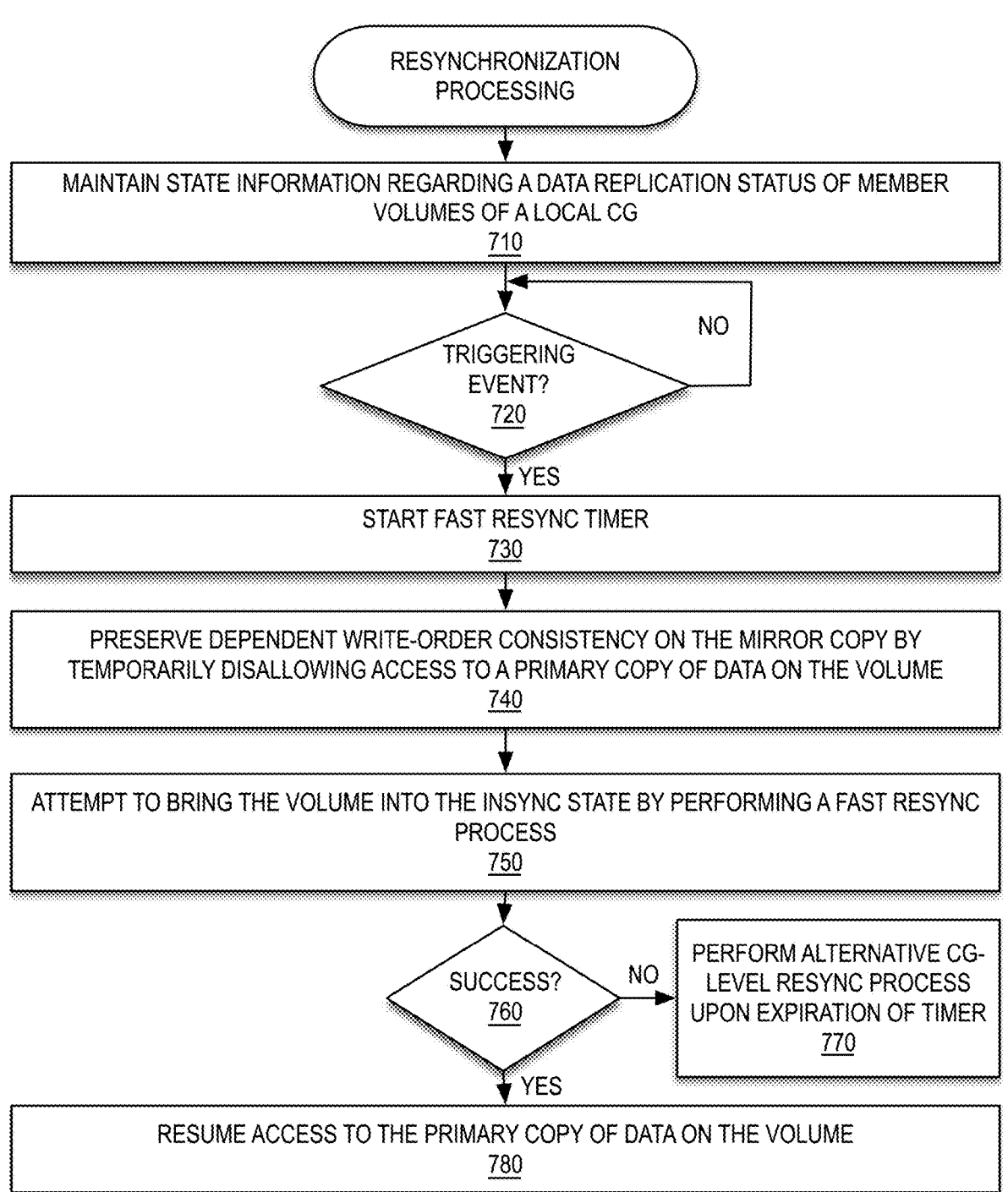
FIG. 7 is a high-level flow diagram illustrating a set of operations for performing a resynchronization process in accordance with an embodiment of the present disclosure.

FIG. 7 is a high-level flow diagram illustrating a set of operations for performing a resynchronization process in accordance with an embodiment of the present disclosure. At block 710, state information regarding member volumes of a local CG maintained. The state information may include a data replication status of a mirror copy of a dataset associated with a local CG (e.g., CG 515a), for example, to facilitate automatic triggering of resynchronization. For example, the state information may include information relating to the current availability or unavailability of a peer volume of a remote CG corresponding to a member volume of the local CG and/or the data replication state of the local CG. In one embodiment, the state information may track the current state of a given CG and a given volume consistent with the state diagrams of FIG. 6A and FIG. 6B.

At decision block 720, it is determined whether a triggering event has occurred. If so, then processing continues with bock 730; otherwise, processing loops back to decision block 720. According to one embodiment, the triggering event represents detecting a volume of the local CG has transitioned from the InSync state to the OOS state, for example, as a result of a peered volume of a remote CG (e.g., CG 515b) being unavailable (e.g., unreachable via communications via a network coupling the distributed storage system with the remote distributed storage system). In alternative embodiments, resynchronization may be triggered by other means, for example, via a command issued by an administrative user of the cross-site storage solution of which the distributed storage system and the remote distributed storage system are a part). Additionally, or alternatively, a change in network availability from unavailable to available while a volume is in the OOS state may trigger resynchronization. For example, a network subsystem may notify the subsystem responsible for performing resynchronization regarding network connectively between a particular pair of peered volumes of the local CG and the remote CG and based on that resynchronization subsystem can trigger resynchronization.

At block 730, a fast resync timer may be started. In one embodiment, the fast resync timer is set to a value that is selected to avoid I/O disruption from impacting an application associated with the local CG, which is protected by the remote CG. For example, the fast resync timer may be set to a typical command timeout interval (e.g., between approximately 30 to 90 seconds, inclusive, depending on the storage protocol at issue) so as to either complete the process of bringing the volume back to the InSync state via the Fast Resync process (e.g., at block 750) or take the entire CG OOS within the timeout period (e.g., at block 770); otherwise, I/O disruption might be seen by the application making use of the member volumes of the local CG.

At block 740, dependent write-order consistency on the mirror copy is preserved in advance of initiating the Fast Resync process by temporarily disallowing or suspending I/O access to a primary copy of the data on the OOS volume(s) at issue. According to one embodiment, a persistent fence is established to disallow I/O on the volume(s) at issue. Since, in one example, I/O is disallowed or suspended, for example, until synchronous replication resumes, there is no requirement to perform the coordinated OOS for all member volumes of a CG (unless the Fast Resync cannot be completed successfully within the timeout period). Since I/O is prevented for the volume(s) at issue, I/O on the remaining volumes that are not affected by the disruptive operation can continue as dependent writes cannot come in. As a result, those member volumes of the local CG that are not affected by the disruptive operation remain InSync, while the volume(s) that is/are affected, may hold I/O (or fail I/O with Host retriable error) until synchronous replication resumes. At which point, client I/O may be allowed to resume on the local copy as described below with reference to block 780 and the client I/O also replicated to the mirror, thereby providing a zero RPO guarantee.

At block 750, an attempt is made to bring the volume(s) at issue into the InSync state by performing a Fast Resync process. As noted above, in various examples described herein, multiple different types of resynchronization processes may be implemented by the cross-site storage solution, at least one of which (e.g., the Fast Resync process) may be specifically designed to have the ability to complete within a typical command timeout interval. As such, if the Fast Resync process is able to successfully bring the volume(s) at issue back into the InSync within the timeout interval, the application making use of the local CG will experience no adverse effects as a result of the Fast Resync process. A number of different approaches may be used to implement either or both of the Fast Resync process and the CG-level resync process, including, but not limited to, the use of persistent tracking of inflight operations being replicated from the primary cluster to the secondary cluster, the use of snapshots, and combinations thereof. In one embodiment, the Fast Resync process involves the use of a persistent inflight tracker to perform a persistent inflight tracking (IFT-P) replay as described further below with reference to FIG. 9. In one embodiment, the CG-level resync process involves the use of the last common snapshot and snapshots are periodically performed (e.g., every hour).

At decision block 760, it is determined whether the Fast Resync process was able to successfully bring the volume(s) at issue back into the InSync state. If so, then processing continues with block 780; otherwise processing branches to block 770.

At block 770, an alternative (or fallback) CG-level resync may be performed upon expiration of the fast resync timer set at block 730. In one embodiment, the CG-level resync may involve first performing a coordinated CG-level OOS process (e.g., as described with reference to FIG. 8A) followed by a CG-level resynchronization process (e.g., as described with reference to FIG. 8B).

Coordinated CG-Level OOS Processing

FIG. 8A is a flow diagram illustrating a set of operations for performing a coordinated CG-level out of synchronization process in accordance with an embodiment of the present disclosure. In the context of the present example, it is assumed a member volume of a local CG (e.g., CG 515a) of a local distributed storage system (e.g., cluster 510a) is OOS with respect to its peer volume of a remote distributed storge system (e.g., cluster 510b), meaning the mirror copy hosted by the member volumes of the remote CG is out of synchronization with respect to the primary dataset hosted by the member volumes of the local CG. In some scenarios, as a CG represents a distributed object within a cross-site storage solution, efforts are undertaken to ensure dependent write-order consistency of the mirror copy by driving all member volumes of the local CG OOS, for example, responsive to detecting any member volume of the local CG. In other examples, such as when the coordinated CG-level OOS processing is invoked following unsuccessful completion of a Fast Resync, those of the member volumes that successfully transitioned from the OOS state (e.g., OOS 640) to the InSync state (e.g., InSync 630) as a result of the Fast Resync are excluded from participating in the CG-level OOS processing. In this manner, replication of data between peered volumes may be temporarily halted to preserve dependent write-order consistency until the local CG has been brought back into an InSync state (e.g., InSync 610).

At block 810, the local distributed storage system detects a first volume of the local CG is in the OOS state.

At block 820, responsive to detecting the first volume is in the OOS state, access to data stored on the first volume is temporarily disallowed. According to one embodiment, responses to any completed operations may be held until this distributed transaction completes so as prevent any dependent writes from entering any member volume of the local CG. Alternatively, the I/O operations themselves may be held to accomplish the same objective, albeit, with potentially higher latency. An advantage of the former approach over the latter approach is that the processing of I/O operations is allowed to complete with only the corresponding responses being held while the distributed transaction is taking place. Then, once the distributed transaction completes, the held responses may be released resulting in no additional latency.

At block 830, other member volumes of the local CG are caused to temporarily disallow access to their respective data by broadcasting, on behalf of the first volume, a first consensus protocol request (e.g., a request issued by an implementation of the Paxos family of protocols for solving consensus) to the local CG. A consensus protocol request typically involves a three-way handshake between the initiator and the target, including a phase 1 request from the initiator to the target(s), a phase 1 acknowledgement (ACK) from the target(s) to the initiator, and a phase 2 request from the initiator to the target(s). The phase 1 request may represent a vote request/phase used to confirm each member is available in the group and ready to receive the phase 2 request. The phase 1 ACK may be used to acknowledge the vote in favor of receiving the phase 2 request. In any event, in one embodiment, responsive to receipt of the first consensus protocol request, by or on behalf of the other member volumes of the local CG, access to their respective data is temporarily disallowed and respective acknowledgements may be returned.

At block 840, the other member volumes of the local CG are caused to transition into the OOS state and to resume allowing access to their respective data. In one embodiment, block 840 may be triggered responsive to receipt of acknowledgements (e.g., the phase 2 ACKs associated with the first consensus protocol request) from the other member volumes and may involve broadcasting, on behalf of the first volume, a second consensus protocol request to the local CG. In one embodiment, responsive to receipt of the second consensus protocol request, by or on behalf of the other member volumes of the local CG, the state transition is performed and access to their respective data is resumed.

For sake of generality and applicability to either (i) the use of the coordinated CG-level OOS following a Fast Resync that has been unsuccessful in bringing at least one member volume of the local CG into the InSync state or (ii) the independent use of the CG-level OOS separate and apart from the Fast Resync, the coordinated CG-level OOS is described in the context of the present example as a first volume causing all other member volumes of the local CG to transition into the OOS state. It is to be appreciated, however, when the coordinated CG-level OOS processing is invoked following a Fast Resync, the coordinated CG-level OOS processing may be modified so as to avoid participation in the process by those of the member volumes that have successfully been brought back into the InSync state by the Fast Resync process. For example, processing performed responsive to blocks 830 and 840 may be made a "no operation" (No-op) for such member volumes, thereby effectively allowing such member volumes to be left unaffected by the coordinated CG-level OOS process and only impacting those of the member volumes remaining in the OOS state following the Fast Resync.

While in the context of the present example, the use of two separate consensus protocol requests are described (e.g., a first to cause the other member volumes to temporarily disallow access to their respective data and a second to cause the other member volumes to transition into the OOs state and resume access to their respective data), in alternative embodiments, an optimization may be implemented to reduce the amount of time to achieve the desired result. In one embodiment, volumes may be operable to take action responsive to an intermediate stage of a single consensus protocol request so as to reduce I/O disruption and/or the amount of time otherwise required to resume I/O. For example, in block 830, the other member volumes may take action responsive to receipt of a phase 1 request of the single consensus protocol request and in block 840 the other member volumes may take action responsive to receipt of a phase 2 request of the single consensus protocol request. In this manner, I/O disruption that would typically span the time it takes to perform two consensus protocol requests may be reduced by one half by leveraging the phase 1 request (e.g., the vote phase) as one step to start the OOS process by causing the member volumes to stop I/O access.

CG-Level Resynchronization

Figure 8B:
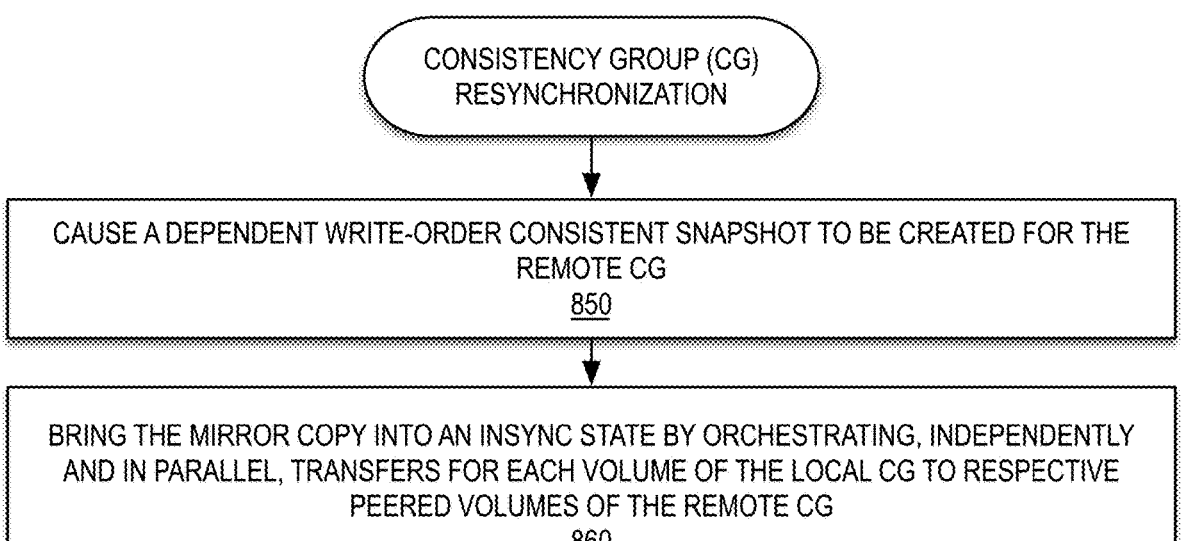
FIG. 8B is a flow diagram illustrating a set of operations for performing a CG-level resynchronization in accordance with an embodiment of the present disclosure.

FIG. 8B is a flow diagram illustrating a set of operations for performing a CG-level resynchronization in accordance with an embodiment of the present disclosure. In the context of the present example, it is assumed at least one member volume and possible all member volumes of a local CG (e.g., CG 515a) of a local distributed storage system (e.g., cluster 510a) is/are OOS with a respective peer volume of a remove CG (e.g., CG 515b) of a remote distributed storge system (e.g., cluster 510b) as a result of performance of a coordinated CG-level OOS process (e.g., the coordinated CG-level OOS process described with reference to FIG. 8A).

At block 850, a dependent write-order consistent snapshot is caused to be created for the remote CG to preserve data associated with the remote CG. As described above in connection with FIG. 8A, this may involve the broadcast of one or more consensus protocol requests the receipt of which may trigger the other member volumes to temporarily disallow access to their respective data and to perform the desired action (in this case, creation of a snapshot).

At block 860, the mirror copy is brought into the InSync state (e.g., InSync 610) by orchestrating, independently and in parallel, transfers for each volume of the local CG to respective peered volumes of the remote CG.

While in the context of the present example, more individual parallel transfers of data may be involved as a result of performing the resynchronization independently on a volume-by-volume basis, advantageously, a failure during the resynchronization of one member volume of the CG will not affect the ability of any of the other member volumes to some to the steady state of InSync. In this manner, when a restart of the CG-level resynchronization process is performed due to such a failure, the subsequent resynchronization may exclude those member volumes that are already in the InSync state and need only be retried for those that remain in the OOS state.

Persistent Inflight Tracker for Fast Resync

Depending upon the particular implementation, operations may be sequentially split or a parallel split of operations may be performed. When operations are sequentially split (e.g., operations are first completed on a primary storage cluster and then completed on a secondary storage cluster), the active Op Log entries at a destination will be either a subset of Op log entries at a primary storage cluster or at best be the same as the Op log entries on the primary storage cluster. In one example, establishing a range of operations to be considered for persistent inflight tracking (IFT-P) replay for sequentially-split operations, can simply involve identifying a range of Ops on the Op log of the primary storage cluster.

In the case of a parallel split of operations, an incoming Op (e.g., incoming WRITE operation) is sent to a synchronization replication circuitry (SR circuitry) in the primary storage cluster and the secondary storage cluster in parallel. Parallel splitting of Ops (e.g., Write Ops) improves performance of the Synchronous replication circuitry. By dispatching writes to local storage and its copies in parallel, the synchronous replication allows for fan-out factor of more than 1. Fan-out can be described as a topology where a single primary is associated with multiple secondary copies where the primary copy is read-write and the secondary copies are read-only. In this way, synchronous replication, using a parallel-splitting based architecture, allows for more than 1 synchronous copy to be maintained without a linear increase in client latency or other overhead. However, this creates additional work from an Op logging perspective including:

a. Establishment of a range of operations for IFT-P replay. It is possible that a primary storage cluster is ahead of the secondary storage cluster for the processing of the operations, secondary storage cluster is ahead, or one of the primary or second storage clusters has a subset of a range of operations of the other storage cluster, etc.

b. Reconciliation of WRITE operations that fail on a primary storage cluster, but succeed on a secondary storage cluster. In one embodiment, a Quick Reconcile (QR) procedure may be invoked when a parallel split WRITE operation fails on the primary storage cluster, but succeeds on the secondary storage cluster. The QR procedure may involve undoing the WRITE operation on the secondary storage cluster by bringing back old data from the primary storage cluster. This can be a compound operation which may include one or more WRITES, PUNCH HOLES or both. The quick reconcile procedure should also be Op logged to indicate its completion so that during IFT-P replay, this QR procedure is skipped if the QR procedure is already complete.

Figure 9:
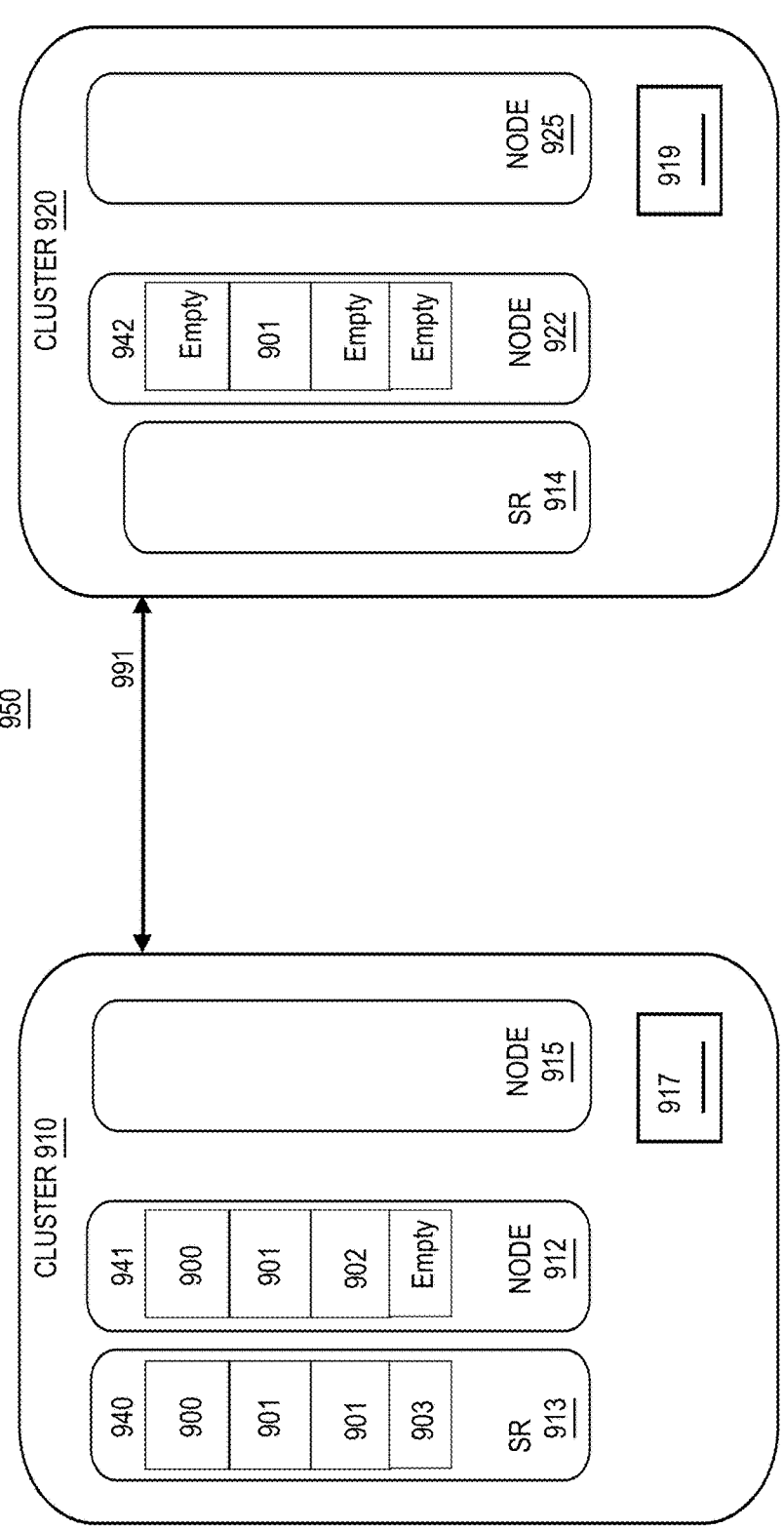
FIG. 9 is a block diagram illustrating a persistent inflight tracker that is implemented with operation (Op) logs in a distributed storage system in accordance with an embodiment of the present disclosure.

FIG. 9 is a block diagram illustrating a persistent inflight tracker that is implemented with operation (Op) logs in a distributed storage system in accordance with an embodiment of the present disclosure. In one embodiment, the distributed storage system 900 includes a primary storage cluster 910 with a primary copy of data in a consistency group (CG) that may include a subset or all volumes or data containers of a storage node. The consistency group can include volumes of nodes 912 and 915. Initially, this CG can be assigned a primary role. The secondary storage cluster 920 has a mirror copy of the data in a consistency group that may include volumes of nodes 922 and 925. This CG can be initially assigned a secondary role.

Each storage cluster may include a configuration database (e.g., persistent replicated database (RDB) 917, 919, RDB 512a, RDB 512b), which may be available on or otherwise accessible by all storage nodes of a storage cluster. Each storage cluster includes synchronization replication circuitry (SR circuitry) 913 and 914 for synchronous replication between the storage clusters.

The operation logs or journals synchronize across a filesystem from a primary storage cluster 910 having a primary copy of data and secondary storage cluster 920 having a mirror copy of the data. In the event of an Out of Sync state for a volume due to a network glitch, or a node crash, a disruptive operation, etc., a mechanism is designed to protect data for the volume and its mirror copy, avoid a coordinated OOS state for other volumes within the same CG as the OOS volume, and also avoid an OOS notification from nodes of the secondary storage cluster acting as a secondary to an external mediator.

Embodiments of the present disclosure provide an Op log 941 on primary copy of node 912 and another Op log 942 on the secondary copy of node 922. Both of the copies will specify which operations are committed on each of the sides of the storage clusters. These two copies can be used to find how the filesystems for each storage cluster differ and to carry out resynchronization if necessary.

In one example, persistent inflight tracking uses In-Volume metafiles and has a minimal impact on the Op path length. A Write to metafile isn't logged in memory (e.g., non-volatile memory). Instead, a non-volatile log replay of the Op regenerates the entry in the metafile.

The SR circuitry 913 includes an active Ops log file 940 and can be implemented with a circular array. For each Op, the SR circuitry 913 specifies its view of an Inflight Op range <Head, Tail> in a message payload. Even though responses come out of order, the SR circuitry 913 waits for a head Op to be completed and frees up all consecutive Ops which are responded to next.

In one embodiment, the following represent the features of logging that should be adhered to:

1. Every Op that is split will carry the following payload with it: Op Sequence (Seq) Number, Head Seq Number (Num) as specified by SR circuitry.
2. Since independent Ops are dispatched in parallel and executed in parallel, an Op is allowed to update the <Head Op Seq Num, Tail Op Seq Num> only if the Op Seq Num is >Tail Op Seq Num.
3. When an Op updates <Head Op Seq Num, Tail Op Seq Num>, only the Op with Op Seq Num=Tail Op Seq Num is guaranteed to be present in the Log file. It is possible that all Ops from (Tail Op Seq Num−1) until (Head Op Seq Num) haven't been received and hence not logged. It is the responsibility of the IFTP replay process to determine valid values from the Active Op Log for replay.

In one example, an Op log file is a circular log file where an Op is inserted into the Active Op Log at the index=(Op Seq Num % Max Entries).

Establishment of a Range of Operations for IFT-P Replay

As discussed above, for sequentially-spit operations, the active Op Log entries at a destination will be either a subset of Op log entries at a primary storage cluster or at best be the same as the Op log entries on the primary storage cluster. Therefore, in one embodiment, establishing a range of operations to be considered for persistent inflight tracking (IFT-P) replay for sequentially-split operations, can simply involve identifying a range of Ops on the Op log of the primary storage cluster.

Turning now to the case of parallel split of operations, because a number of different scenarios are possible, including, but not limited to, the primary storage cluster is ahead of the secondary storage cluster for the processing of the operations, the secondary storage cluster is ahead, or one of the primary or second storage clusters has a subset of a range of operations of the other storage cluster, in one example, establishing a range of operations to be considered for persistent inflight tracking (IFT-P) replay for parallel-split operations, can involve the example algorithm described below.

For purposes of this example, every Op or message that is split, is assumed to carry <HeadOpSeqNum, OpSeqNum> which basically is the SR circuitry's view of what is inflight. Both the Active Op Log of the primary storage cluster and Active Op Log of the secondary storage cluster know the <HeadOpSeqNum, TailOpSeqNum> which indicates the range of Ops that are potentially in the Log file. The Head Op Sequence Numbers indicates a first sequence number for a first Op and Tail Op Sequence Number indicates a last sequence number for a last Op within the range of Ops. Using the primary and secondary Op logs for the parallel split, it is possible to determine which Ops should be replayed to bring them back into synchronization.

First, the Op logs of the primary and secondary storage clusters may be compared. If the ranges are the same for the Op logs, then the entries from a first entry to a last entry (e.g., Head to Tail) for primary and secondary Op logs may be compared and the missing entries may be replayed.

If one range is a subset of the other range for an Op log, then the larger of the ranges may be used to compare entries. Entries present on the primary, but not on the secondary should be replicated to the other side. Entries present on the secondary, but not on the primary, should be undone on the secondary storage cluster.

If the ranges intersect/overlap, then the entries in a lower range up to the intersection point should be discarded by IFTP-replay because these entries have been executed on both endpoints of the primary and secondary clusters, acknowledged back to the SR circuitry, and freed up by the SR circuitry. Then, the entries in the higher range should be used for IFT-P replay.

If the ranges in the Op logs are disjoint, then the entries in a lower range should be discarded because they have been executed on both the endpoints, acknowledged back and freed up by the SR circuitry (e.g., splitter component of SR circuitry). Then, the entries in the higher range having higher sequence numbers should be used for IFT-P resync. Depending on which endpoint has the range with higher seq numbers, those may have to be replicated to secondary storage cluster or undone on the primary storage cluster as appropriate.

Figure 10:
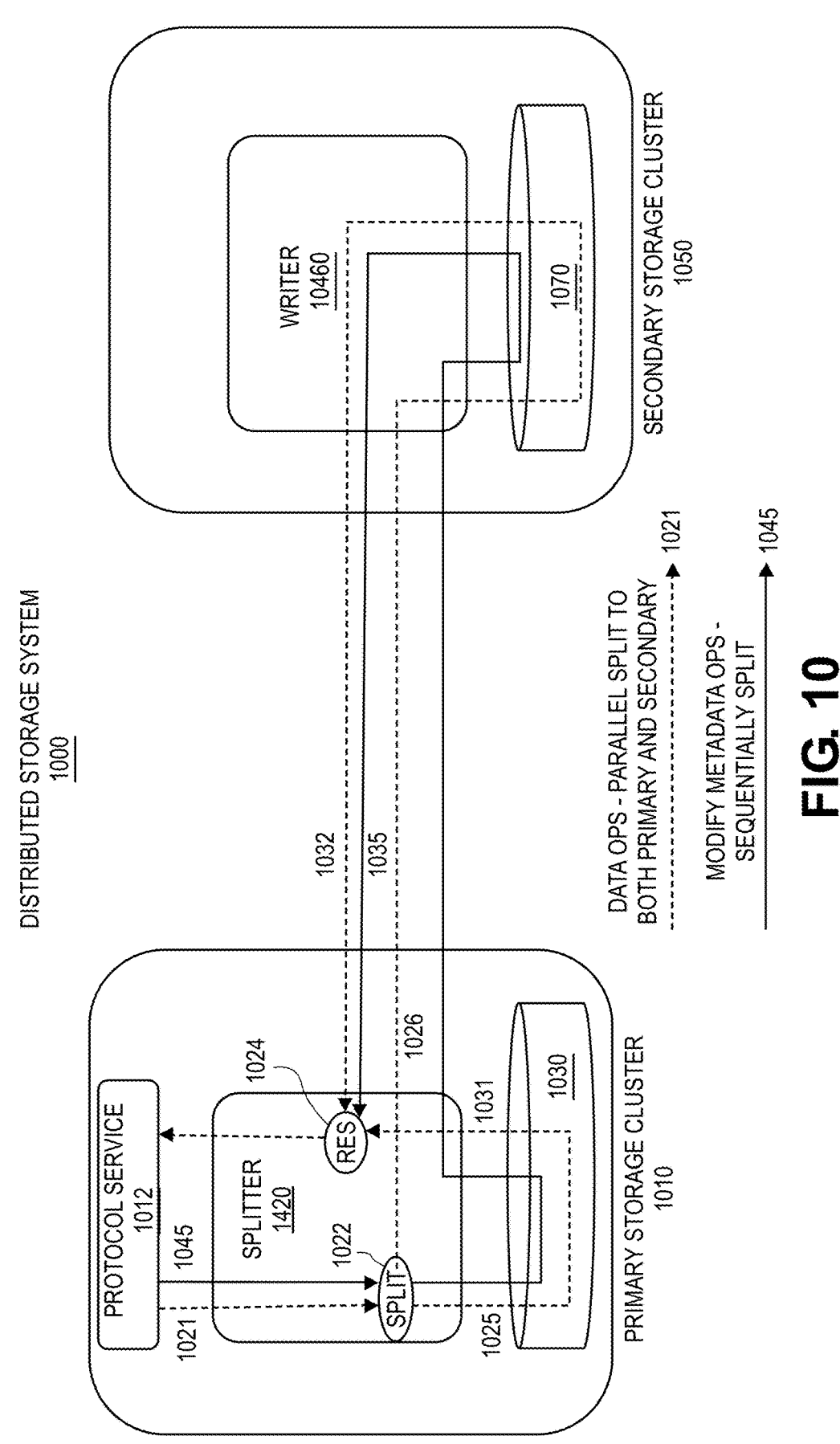
FIG. 10 illustrates parallel splitting of data Ops and sequentially splitting of modifying metadata Ops for a multi-site distributed storage system in support of performing synchronous replication (SR) between primary and secondary sites in accordance with one embodiment of the present disclosure.

FIG. 10 illustrates parallel splitting of data Ops and sequentially splitting of modifying metadata Ops for a multi-site distributed storage system having synchronous replication (SR) between primary and secondary sites in accordance with one embodiment. The multi-site distributed storage system 1000 includes a splitter component 1020 (or replicating circuitry) and a primary file system 1030 that are located in a primary storage cluster 1010 while a writer 1060 and a secondary file system 1070 are located in a secondary storage cluster 1050. The granularity of protection and failover is a consistency group, which is a plurality of volumes that together host application data.

Initially, operations are received and handled by a protocol service 1012 (e.g., NAS service, SAN service) of the primary cluster 1030 and then the operations can be queued in a queue 1022 of splitter component 1020. The operations may represent a data operation (e.g., WRITE or PUNCH HOLE) or a metadata operation (e.g., CREATE, OPEN, RENAME, LINK, UNLINK, SETATTR, etc.) to be executed on a file associated with a volume hosted by a node of a storage cluster (e.g., primary storage cluster 1010, secondary storage cluster 1050). In one embodiment, by convention, operations to be executed in relation to a particular member volume of a CG may be directed to a monarch node and performed by an SVM (e.g., SVM 511*a* or 511*b*). According to one embodiment, within a particular CG one volume may be considered the monarch volume. The node within the cross-site storage solution that hosts the monarch volume may be considered the monarch node. The monarch node may orchestrate the resynchronization of each individual member volume. For purposes of clarifying the difference between a master (primary) node and a monarch node, in various embodiments described herein, there may be one master node per distributed storage system and one monarch node per CG.

An entry for the Op is added to the queue. The protocol service 1012 or splitter component 1020 will determine whether the Op is a data operation or a metadata operation to be executed on a file. If a data operation is being processed, then a parallel split process 1021 causes the data operation to be sent along paths 1025 and 1026 to the file systems 1030 and 1070, respectively, in parallel simultaneously. Next, the file system 1030 computes a location for a record of the data operation, inserts the data operation, updates a log marker if permitted, and deletes any older entries in the Op log of the primary storage cluster if these entries are not needed.

The splitter component 1020 will update the record state in splitter active Ops as responded for the data operation. The replicated data operation is sent to writer 1060 to be executed on a replicated storage object. The replicated data Op is provided into a record of file system 1070, which also computes a location for a record of the replicated Op, inserts the replicated Op, updates a log marker if permitted, and deletes any older entries in the Op log if these entries are not needed. Subsequently, the result processor 1024 will receive updates for the data operation along paths 1031 and 1032. The record state in splitter active Ops is updated as responded for the data operation. The result processor 1024 sends updates to the protocol service 1012.

If a metadata operation is being processed, then a sequential split process 1045 causes the data operation to be sent initially to the file system 1030 and then sequentially to the file system 1070. The splitter component 1020 will update the record state in splitter active Ops as responded for the data operation. The replicated data operation is sent to writer 1060 to be executed on a replicated storage object. Subsequently, the result processor 1024 will receive an update for the data operation along sequential path 1035. The record state in splitter active Ops is updated as responded for the data operation. The result processor 1024 sends updates to the protocol service 1012.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 11:
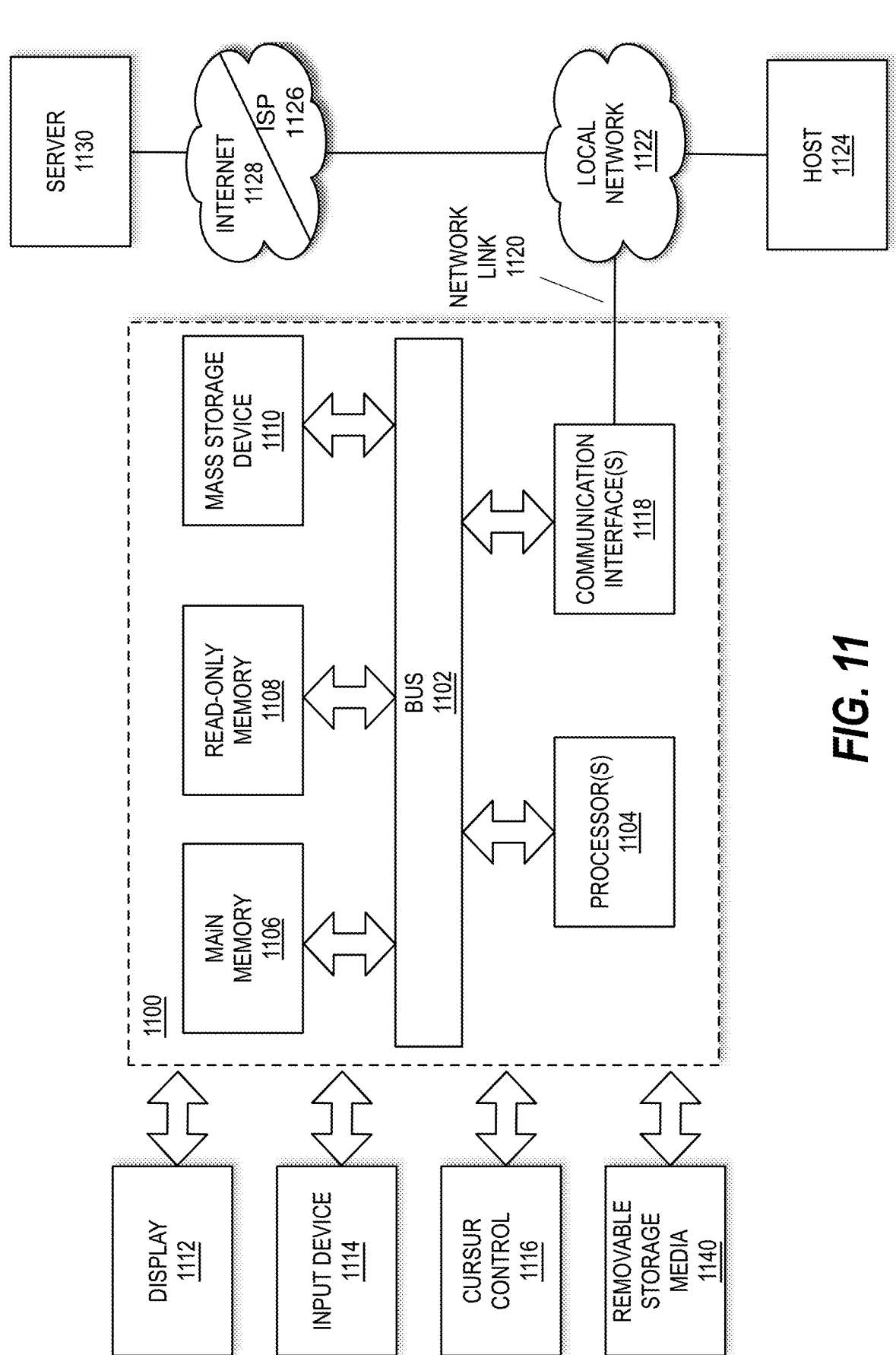
FIG. 11 illustrates an example computer system in which or with which embodiments of the present disclosure may be utilized.

FIG. 11 is a block diagram that illustrates a computer system 1100 in which or with which an embodiment of the present disclosure may be implemented. Computer system 1100 may be representative of all or a portion of the computing resources associated with a node (e.g., storage nodes 136*a-n* or storage nodes 146*a-n*) of a distributed storage system (e.g., cluster 235 or 245) or an administrative workstation (e.g., computer system 110 or 210). Notably, components of computer system 1100 described herein are meant only to exemplify various possibilities. In no way should example computer system 1100 limit the scope of the present disclosure. In the context of the present example, computer system 1100 includes a bus 1102 or other communication mechanism for communicating information, and a processing resource (e.g., a hardware processor 1104) coupled with bus 1102 for processing information. Hardware processor 1104 may be, for example, a general-purpose microprocessor.

Computer system 1100 also includes a main memory 1106, such as a random-access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, e.g., a magnetic disk, optical disk or flash disk (made of flash memory chips), is provided and coupled to bus 1102 for storing information and instructions.

Computer system 1100 may be coupled via bus 1102 to a display 1112, e.g., a cathode ray tube (CRT), Liquid Crystal Display (LCD), Organic Light-Emitting Diode Display (OLED), Digital Light Processing Display (DLP) or the like, for displaying information to a computer user. An input device 1114, including alphanumeric and other keys, is coupled to bus 1102 for communicating information and command selections to processor 1104. Another type of user input device is cursor control 1116, such as a mouse, a trackball, a trackpad, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Removable storage media 1140 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 1100 may implement the techniques described herein using customized hard-wired logic, one or more ASICs or FPGAs, firmware or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 1110. Volatile media includes dynamic memory, such as main memory 1106. Common forms of storage media include, for example, a flexible disk, a hard disk, a solid-state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface

1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the worldwide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118. The received code may be executed by processor 1104 as it is received, or stored in storage device 1110, or other non-volatile storage for later execution.

What is claimed is:

1. A method comprising:

maintaining information regarding a state of data replication between a primary volume and a secondary volume of a plurality of volume pairs, wherein the primary volume of a given volume pair of the plurality of volume pairs is a member of a local consistency group (CG) of a primary cluster of a distributed storage system on which a primary dataset is stored and the secondary volume of the given volume pair is a member of a remote CG of a secondary cluster of the distributed storage system on which a mirror copy of the primary dataset is stored; and bringing a first volume pair of the plurality of volume pairs for which the state of data replication is out-of-synchronization into synchronization, by selectively employing one or more of a first resynchronization process and a second resynchronization process.

2. The method of claim 1, wherein the first resynchronization process involves the use of one or more operation logs that include completion status for inflight operations associated with the data replication.

3. The method of claim 2, wherein the second resynchronization process involves the use of a last common snapshot.

4. The method of claim 3, wherein said selectively employing comprises:

initially attempting the first resynchronization process; and after a failure of the first resynchronization process to successfully bring the state of each of the plurality of volume pairs to in-synchronization within a predetermined or configurable period of time, attempting the second resynchronization process.

5. The method of claim 4, wherein the predetermined or configurable period of time is selected to avoid input/output disruption from impacting an application associated with the local CG and the remote CG.

6. The method of claim 2, further comprising prior to the first resynchronization process preserving dependent write-order consistency on the mirror copy by temporarily disallowing access to a primary copy of data stored on the primary volume of the first volume pair.

7. The method of claim 6, further comprising during the first resynchronization process allowing input/output operations to continue for the second volume pair.

8. The method of claim 7, further comprising after successful completion of the first resynchronization process, resuming the access to the primary copy of the data stored on the first volume.

9. A non-transitory computer-readable storage medium embodying a set of instructions, which when executed by one or more processing resources of a distributed storage system, cause the distributed storage system to:
   maintain information regarding a state of data replication between a primary volume and a secondary volume of a plurality of volume pairs, wherein the primary volume of a given volume pair of the plurality of volume pairs is a member of a local consistency group (CG) of a primary cluster of a distributed storage system on which a primary dataset is stored and the secondary volume of the given volume pair is a member of a remote CG of a secondary cluster of the distributed storage system on which a mirror copy of the primary dataset is stored; and
   bring a first volume pair of the plurality of volume pairs for which the state of data replication is out-of-synchronization into synchronization, by selectively employing one or more of a first resynchronization process and a second resynchronization process.

10. The non-transitory computer-readable storage medium of claim 9, wherein the first resynchronization process involves the use of an operation log based approach in which one or more operation logs include completion status for inflight operations associated with the data replication.

11. The non-transitory computer-readable storage medium of claim 10, wherein the second resynchronization process involves a point-in-time snapshot based approach.

12. The non-transitory computer-readable storage medium of claim 11, wherein said selectively employing comprises:
   initially attempting the first resynchronization process; and
   after a failure of the first resynchronization process to successfully bring the state of each of the plurality of volume pairs to in-synchronization within a predetermined or configurable period of time, attempting the second resynchronization process.

13. The non-transitory computer-readable storage medium of claim 10, wherein the instructions further cause the distributed storage system to, prior to the first resynchronization process, preserve dependent write-order consistency on the mirror copy by temporarily disallowing access to a primary copy of data stored on the primary volume of the first volume pair.

14. The non-transitory computer-readable storage medium of claim 13, wherein the instructions further cause the distributed storage system to, during the first resynchronization process, allow input/output operations to continue for the second volume pair.

15. The non-transitory computer-readable storage medium of claim 14, wherein the instructions further cause the distributed storage system to, after successful completion of the first resynchronization process, resume the access to the primary copy of the data stored on the first volume.

16. A distributed storage system comprising:
   one or more processing resources; and
   instructions that when executed by the one or more processing resources cause the distributed storage system to:
      maintain information regarding a state of data replication between a primary volume and a secondary volume of a plurality of volume pairs, wherein the primary volume of a given volume pair of the plurality of volume pairs is a member of a local consistency group (CG) of a primary cluster of a distributed storage system on which a primary dataset is stored and the secondary volume of the given volume pair is a member of a remote CG of a secondary cluster of the distributed storage system on which a mirror copy of the primary dataset is stored; and
      bring a first volume pair of the plurality of volume pairs for which the state of data replication is out-of-synchronization into synchronization, by selectively employing one or more of a first resynchronization process and a second resynchronization process.

17. The distributed storage system of claim 16, wherein:
   the first resynchronization process involves the use of an operation log based approach in which one or more operation logs include completion status for inflight operations associated with the data replication; and
   the second resynchronization process involves an approach that makes use of a point-in-time snapshot.

18. The distributed storage system of claim 17, wherein said selectively employing comprises:
   initially attempting the first resynchronization process; and
   after a failure of the first resynchronization process to successfully bring the state of each of the plurality of volume pairs to in-synchronization within a predetermined or configurable period of time, attempting the second resynchronization process.

19. The distributed storage system of claim 17, wherein the instructions further cause the distributed storage system to:
   prior to the first resynchronization process, preserve dependent write-order consistency on the mirror copy by temporarily disallowing access to a primary copy of data stored on the primary volume of the first volume pair; and
   during the first resynchronization process, allow input/output operations to continue for the second volume pair.

20. The distributed storage system of claim 19, wherein the instructions further cause the distributed storage system to, after successful completion of the first resynchronization process, resume the access to the primary copy of the data stored on the first volume.

* * * * *